US012083792B2

(12) United States Patent
Hiraga

(10) Patent No.: US 12,083,792 B2
(45) Date of Patent: Sep. 10, 2024

(54) LIQUID DISCHARGE APPARATUS AND LIQUID DISCHARGE METHOD

(71) Applicant: Takumi Hiraga, Kanagawa (JP)

(72) Inventor: Takumi Hiraga, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 127 days.

(21) Appl. No.: 18/058,810

(22) Filed: Nov. 25, 2022

(65) Prior Publication Data

US 2023/0173804 A1 Jun. 8, 2023

(30) Foreign Application Priority Data

Dec. 2, 2021 (JP) ................................. 2021-196273

(51) Int. Cl.
*B41J 2/045* (2006.01)

(52) U.S. Cl.
CPC ....... *B41J 2/04541* (2013.01); *B41J 2/04581* (2013.01)

(58) Field of Classification Search
CPC ..... B41J 2/04581; B41J 25/003; B41J 2/2132
See application file for complete search history.

(56) References Cited

U.S. PATENT DOCUMENTS

2004/0250760 A1* 12/2004 Goto ........................ B41J 2/145 118/313
2020/0171817 A1 6/2020 Hada
2020/0303440 A1 9/2020 Hiraga
2022/0184967 A1 6/2022 Hiraga

FOREIGN PATENT DOCUMENTS

JP 2002-113849 4/2002
JP 2003-231247 8/2003
JP 4221921 B2 * 2/2009 ............ B41J 2/2132
JP 2020-082709 6/2020

* cited by examiner

*Primary Examiner* — Sharon Polk
(74) *Attorney, Agent, or Firm* — IPUSA, PLLC

(57) ABSTRACT

A liquid discharge apparatus records dots of liquid on a medium by interlace recording. The liquid discharge apparatus includes a head, a mover, a tilt adjuster, and control circuitry. The head discharges the liquid from nozzles. The mover relatively moves the head and the medium in each of main-scanning and sub-scanning directions. The tilt adjuster changes a tilt of the head with respect to the medium. The control circuitry controls recording on the medium. The control circuitry causes the mover to relatively move the head and the medium in the main-scanning direction with the head tilted to at least a first angle or a second angle. An interval between adjacent nozzles in the sub-scanning direction is a first interval in a state where the tilt is the first angle. The interval is a second interval different from the first interval in a state where the tilt is the second angle.

5 Claims, 15 Drawing Sheets

| | | | | |
|---|---|---|---|---|
| 49 | 8 | 8 | 8 | 8 |
| 50 | 8 | 8 | 8 | 8 |
| 51 | 8 | 8 | 8 | 8 |
| 52 | 7 | 7 | 7 | 7 |
| 53 | 4 | 4 | 4 | 4 |
| 54 | 4 | 4 | 4 | 4 |
| 55 | 6 | 6 | 6 | 6 |
| 56 | 7 | 7 | 7 | 7 |
| 57 | 7 | 7 | 7 | 7 |
| 58 | 5 | 5 | 5 | 5 |
| 59 | 4 | 4 | 4 | 4 |
| 60 | 4 | 4 | 4 | 4 |
| 61 | 4 | 4 | 4 | 4 |
| 62 | 6 | 6 | 6 | 6 |
| 63 | 6 | 6 | 6 | 6 |
| 64 | 3 | 3 | 3 | 3 |
| 65 | 3 | 3 | 3 | 3 |
| 66 | 3 | 3 | 3 | 3 |
| 67 | 2 | 2 | 2 | 2 |
| 68 | 5 | 5 | 5 | 5 |
| 69 | 5 | 5 | 5 | 5 |
| 70 | 1 | 1 | 1 | 1 |
| 71 | 3 | 3 | 3 | 3 |
| 72 | 3 | 3 | 3 | 3 |
| 73 | 8 | 8 | 8 | 8 |
| 74 | 4 | 4 | 4 | 4 |
| 75 | 4 | 4 | 4 | 4 |
| 76 | 7 | 7 | 7 | 7 |
| 77 | 2 | 2 | 2 | 2 |
| 78 | 2 | 2 | 2 | 2 |
| 79 | 6 | 6 | 6 | 6 |
| 80 | 3 | 3 | 3 | 3 |
| 81 | 3 | 3 | 3 | 3 |
| 82 | 5 | 5 | 5 | 5 |
| 83 | 2 | 2 | 2 | 2 |
| 84 | 2 | 2 | 2 | 2 |
| 85 | 4 | 4 | 4 | 4 |
| 86 | 2 | 2 | 2 | 2 |
| 87 | 2 | 2 | 2 | 2 |
| 88 | 3 | 3 | 3 | 3 |
| 89 | 1 | 1 | 1 | 1 |
| 90 | 1 | 1 | 1 | 1 |
| 91 | 2 | 2 | 2 | 2 |
| 92 | 1 | 1 | 1 | 1 |
| 93 | 1 | 1 | 1 | 1 |
| 94 | 1 | 1 | 1 | 1 |
| 95 | 1 | 1 | 1 | 1 |
| 96 | 1 | 1 | 1 | 1 |

LIQUID DISCHARGE APPARATUS AND LIQUID DISCHARGE METHOD

CROSS-REFERENCE TO RELATED APPLICATION

This patent application is based on and claims priority pursuant to 35 U.S.C. § 119(a) to Japanese Patent Application No. 2021-196273, filed on Dec. 2, 2021, in the Japan Patent Office, the entire disclosure of which is hereby incorporated by reference herein.

BACKGROUND

Technical Field

Embodiments of the present disclosure relates to a liquid discharge apparatus and a liquid discharge method.

Related Art

There has been known a liquid discharge apparatus that makes a head that discharges liquid from nozzles and a medium perform a relative movement along each of a main-scanning direction and a sub-scanning direction that intersect each other to record dots of the liquid on the medium by an interlace recording process. The interlace recording process refers to a process in which the dots are recorded in a predetermined area on the medium by a plurality of the relative movements between the head and the medium to record the dots on the medium at intervals narrower than the interval between the adjacent nozzles in the head.

SUMMARY

In an embodiment of the present disclosure, a liquid discharge apparatus records dots of liquid on a medium by interlace recording. The liquid discharge apparatus includes a head, a mover, a tilt adjuster, and control circuitry. The head discharges the liquid from a plurality of nozzles. The mover relatively moves the head and the medium in each of a main-scanning direction and a sub-scanning direction intersecting the main-scanning direction. The tilt adjuster changes a tilt of the head with respect to the medium. The control circuitry controls recording on the medium by the liquid discharge apparatus. The control circuitry causes the mover to relatively move the head and the medium in the main-scanning direction with the head tilted to at least a first angle or a second angle by the tilt adjuster. An interval between adjacent nozzles of the plurality of nozzles in the sub-scanning direction is a first interval in a state where the tilt of the head is the first angle. The interval between adjacent nozzles of the head in the sub-scanning direction is a second interval different from the first interval in a state where the tilt of the head is the second angle.

In another embodiment of the present disclosure, a liquid discharge method is for recording dots of liquid on a medium by interlace recording. The liquid discharge method includes discharging, moving, changing, and controlling. The discharging discharges the liquid from a plurality of nozzles of a recording head. The moving relatively moves the recording head and the medium in each of a main-scanning direction and a sub-scanning direction intersecting the main-scanning direction, in the interlace recording. The changing changes a tilt of the recording head with respect to the medium in the interlace recording. The controlling controls the interlace recording to relatively move the recording head and the medium in the main-scanning direction with the recording head tilted to at least a first angle or a second angle. In the controlling, an interval between nozzles adjacent to each other in the sub-scanning direction is a first interval with the recording head tilted to the first angle, and is a second interval, which is different from the first interval, with the recording head tilted to the second angle.

DETAILED DESCRIPTION

Figure 1:
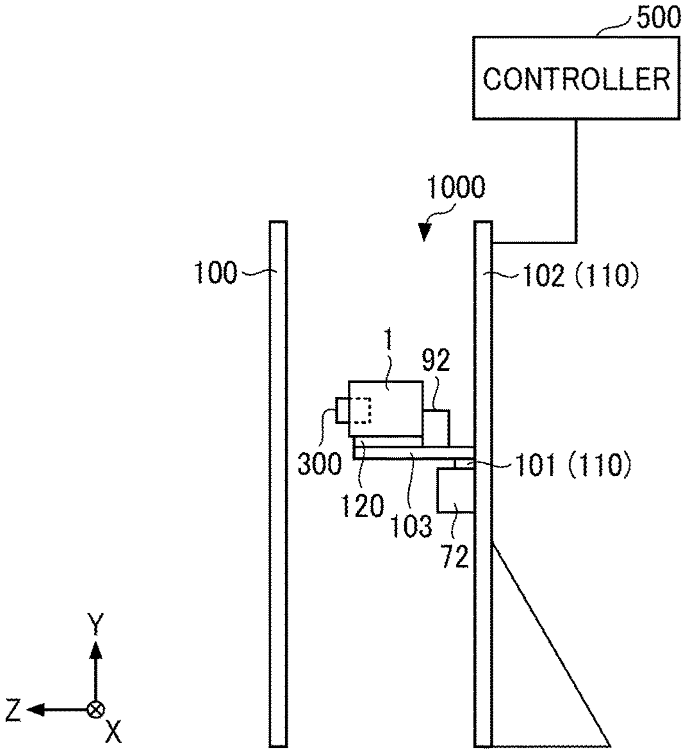
FIG. 1 is a side view illustrating a general configuration of a liquid discharge apparatus according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In order to facilitate understanding of the description, the same constituent elements in the drawings are denoted with the same reference numerals as much as possible, and redundant description is not given.

A liquid discharge apparatus according to an embodiment of the present disclosure will be described in detail with reference to the drawings. However, the following embodiment exemplifies a liquid discharge apparatus for embodying the technical idea of the present embodiment, and it is not limited to the embodiments described below. For example, dimensions, materials, shapes, relative arrangements, and the like of the constituents described in the embodiment are not intended to limit the scope of the present disclosure only thereto unless otherwise specified. The sizes, positional relationships, and the like of the members illustrated in the drawings may be exaggerated for clarity of the description. In the following description, the same or similar members are denoted with the same names and reference numerals, and detailed description thereof is omitted as appropriate.

In the following drawings, directions may be indicated with an X axis, a Y axis, and a Z axis. X directions along the X axis indicate a main-scanning direction in which a carriage included in the liquid discharge apparatus according to the embodiment moves, Y directions along the Y axis indicate a sub-scanning direction intersecting with the main-scanning direction, and Z directions along the Z axis indicate directions intersecting with the X direction and the Y direction.

Of the X directions, a direction in which the arrow is directed is referred to as a +X direction, and a direction opposite to the +X direction is referred to as a −X direction. Of the Y directions, a direction in which the arrow is directed is referred to as a +Y direction, and a direction opposite to the +Y direction is referred to as a −Y direction.

Of the Z directions, a direction in which the arrow is directed is referred to as a +Z direction, and a direction opposite to the +Z direction is referred to as a −Z direction. However, these do not limit the orientation of the liquid discharge apparatus during use, and the orientation of the liquid discharge apparatus is optional.

It is assumed that recording, image formation, printing, and word printing in the terms of the embodiment are synonymous.

General Configuration Example of Liquid Discharge Apparatus

Figure 2:
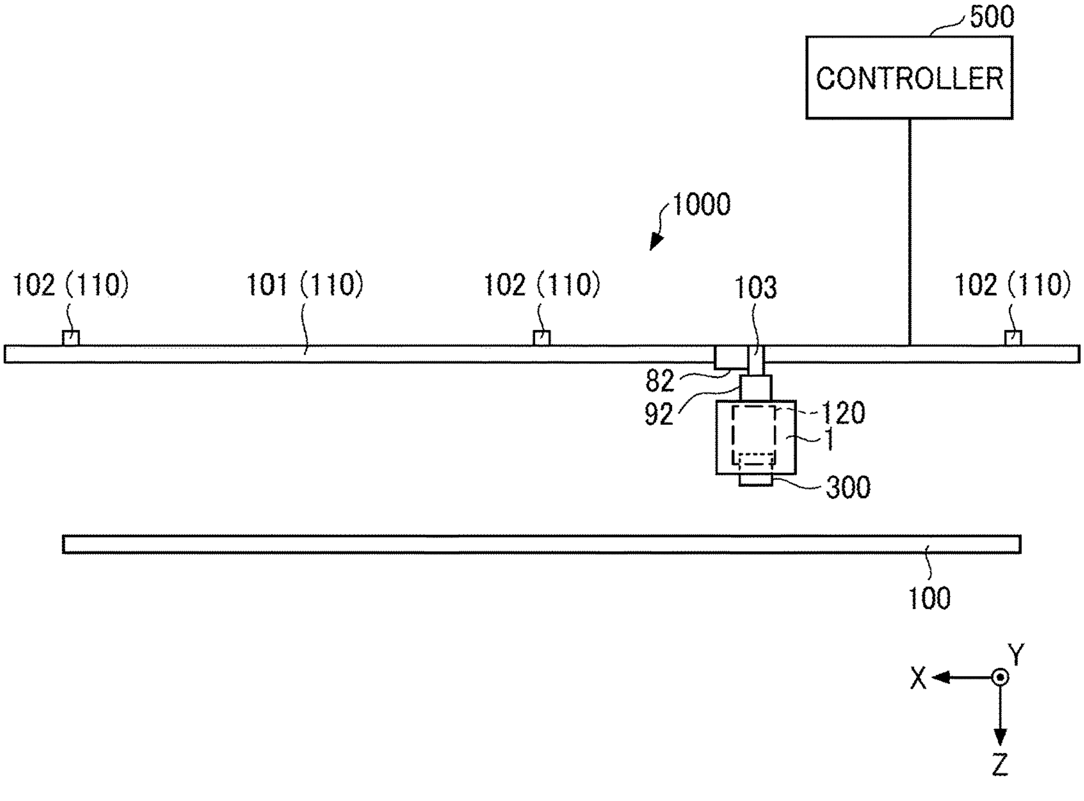
FIG. 2 is a front view illustrating a general configuration of the liquid discharge apparatus of FIG. 1.

A configuration of a liquid discharge apparatus 1000 according to an embodiment will be described with reference to FIGS. 1 and 2. FIGS. 1 and 2 are views illustrating a general configuration of the liquid discharge apparatus 1000. FIG. 1 is a side view. FIG. 2 is a front view.

The liquid discharge apparatus 1000 records dots of inks, which are an example of liquid, on a recording object 100, which is an example of a medium, by an interlace recording process.

As illustrated in FIGS. 1 and 2, the liquid discharge apparatus 1000 includes heads 300, a moving mechanism 110, a tilt-varying mechanism 120, and a controller 500. The liquid discharge apparatus 1000 is installed so as to face the recording object 100 that is an example of a medium.

The head 300 discharges an ink from each of a plurality of nozzles arrayed at predetermined intervals in the Y direction. The heads 300 are mounted on a carriage 1.

The moving mechanism 110 is a mechanism that makes the heads 300 and the recording object 100 perform relative movements in the X direction and the Y direction. The moving mechanism 110 includes an X-axis rail 101 and a Y-axis rail 102.

A Z-axis rail 103 holds the carriage 1 movable in the Z directions. The X-axis rail 101 holds the Z-axis rail 103 in such a manner that the Z-axis rail 103 holding the carriage 1 is movable in the X directions. The Y-axis rail 102 holds the X-axis rail 101 in such a manner that the X-axis rail 101 is movable in the Y directions.

A Z-direction driving device 92 moves the carriage 1 in the Z directions along the Z-axis rail 103.

An X-direction driving device 72 moves the Z-axis rail 103 in the X directions along the X-axis rail 101. A Y-direction driving device 82 moves the X-axis rail 101 in the Y directions along the Y-axis rail 102. The movement of the carriage 1 and the heads 300 in the Z directions may not be parallel to the Z directions, and may be an oblique movement as long as the movement includes at least a Z-direction component.

The tilt-varying mechanism 120 is a rotation mechanism that varies the tilt of the heads 300 with respect to the recording object 100. However, as long as the tilt of the heads 300 with respect to the recording object 100 is varied, a tilt mechanism or the like may be used instead of the rotation mechanism.

The controller 500 is a constituent that controls the recording on the recording object 100 by the liquid discharge apparatus 1000. The controller 500 includes a processor, an electric circuit, or the like mounted on an electric board. The controller 500 is electrically coupled to at least each driving device that drives each of the moving mechanism 110 and the tilt-varying mechanism 120, and the heads 300 in a wired or wireless manner. The arrangement position of the electric board on which the controller 500 is mounted is optional, and may be arranged apart from the heads 300 and the like.

The liquid discharge apparatus 1000 discharges inks from the heads 300 toward the recording object 100 while moving the carriage 1 in each of the X direction, the Y direction, and the Z direction, to perform the recording on the recording object 100.

More specifically, the liquid discharge apparatus 1000 discharges inks from the heads 300 while making the heads 300 and the recording object 100 perform a relative movement in the X direction, which is the main-scanning direction, to record the dots on the recording object 100. After the one relative movement in the X direction is completed, the liquid discharge apparatus 1000 makes the heads 300 and the recording object 100 perform a relative movement in the Y direction, which is the sub-scanning direction. After the one relative movement in the Y direction is completed, the liquid discharge apparatus 1000 discharges inks from the heads 300 while making the heads 300 and the recording object 100 perform a relative movement in the X direction again, to record dots on the recording object 100. The liquid discharge apparatus 1000 repeats such relative movements in the X direction and the Y direction to record dots on the recording object 100.

One relative movement between the heads 300 and the recording object 100 in the X direction is referred to as one scan. One relative movement between the heads 300 and the recording object 100 in the Y direction is referred to as a line feed, and the relative movement amount at the line feed is referred to as a line feed amount.

In a case where the recording object 100 is a planar object along the X direction and the Y direction, the liquid discharge apparatus 1000 does not perform a relative movement between the heads 300 and the recording object 100 in the Z direction during a recording operation. In a case where the recording object 100 has a shape that includes different heights in the Z direction, the liquid discharge apparatus 1000 performs relative movements between the heads 300 and the recording object 100 in the Z direction in accordance with the shape of the recording object 100 during a recording operation.

Although in FIG. 1, the recording object 100 has a planar sheet-like shape, the recording object 100 may have an almost vertical surface or a surface having a large radius of curvature, like a car, a truck, an aircraft, or the like.

Configuration Example of Controller

Figure 3:
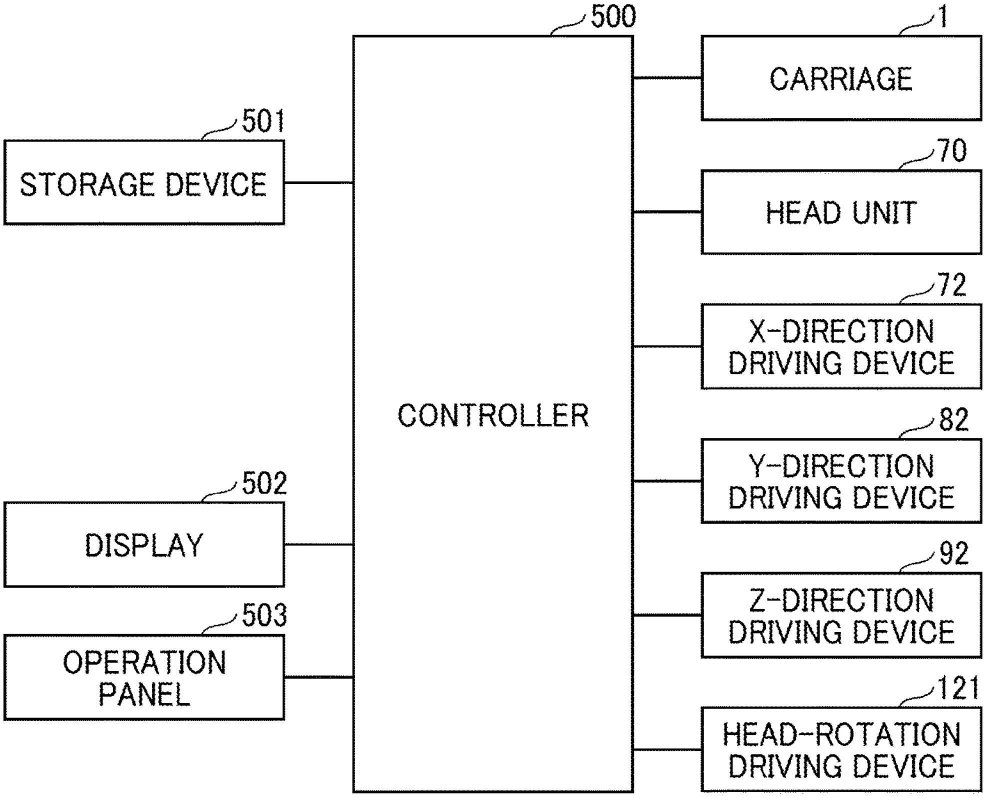
FIG. 3 is a diagram illustrating a configuration around a controller according to an embodiment of the present disclosure.

FIG. 3 is a block diagram illustrating a configuration around the controller 500 included in the liquid discharge apparatus 1000. The controller 500 is coupled to the carriage 1, a head unit 70, the X-direction driving device 72, the Y-direction driving device 82, the Z-direction driving device 92, a head-rotation driving device 121, a storage device 501, a display 502, an operation panel 503, and the like.

The carriage 1 includes the head unit 70, the tilt-varying mechanism 120, the head-rotation driving device 121, and the like. The carriage 1 can move in the X direction, the Y direction, and the Z direction with respect to the recording object 100. The head unit 70 includes the heads 300 and can move in the Z direction with respect to the carriage 1.

On the basis of an instruction from the controller 500, the head-rotation driving device 121 drives the tilt-varying mechanism 120 to tilt the heads 300. On the basis of an instruction from the controller 500, the X-direction driving device 72 drives the carriage 1 in the X directions. On the basis of an instruction from the controller 500, the Y-direction driving device 82 drives the carriage 1 in the Y directions. On the basis of an instruction from the controller 500, the Z-direction driving device 92 drives the carriage 1 in the Z directions.

The controller 500 includes a central processing unit (CPU) that controls operations and processing of the liquid discharge apparatus 1000, and a read-only memory (ROM) that stores a program for executing control, such as the recording operation, on the CPU, and other fixed data. The controller 500 also includes a random-access memory (RAM) that temporarily stores recording data, such as pictures and characters, drawn on the recording object 100, three-dimensional coordinate information, such as a radius of curvature of a recording surface of the recording object 100, and the like, and an interface (I/F) for transmitting and receiving data and signals used when recording data and the like are received from a host, such as a personal computer (PC).

The controller 500 controls the operation of each of the X-direction driving device 72, the Y-direction driving device 82, the Z-direction driving device 92, and the head-rotation driving device 121 to drive the carriage 1 and the head unit 70. The controller 500 also controls discharge of inks from the heads 300 provided in the head unit 70.

For example, in a case where the carriage 1, the head unit 70, and the heads 300 fail to normally operate, the controller 500 displays the failure on the display 502 and notifies the operator. The controller 500 also receives an instruction from the operation panel 503. For example, in a case where a failure occurs in the liquid discharge apparatus 1000, the display 502 displays the contents so as to notify the operator.

The operation panel 503 is used for specifying values (coordinates) for specifying an area (recording area) where inks are discharged onto the recording object 100, a moving speed of the carriage 1, and recording data and three-dimensional coordinate information (body data) used for recording on the recording object 100, and for inputting, for example, a distance between the heads 300 and the recording object 100. Note that the display 502 and the operation panel 503 may be performed by one screen, such as a touchscreen or the like.

Configuration Example of Supply Unit

Figure 4:
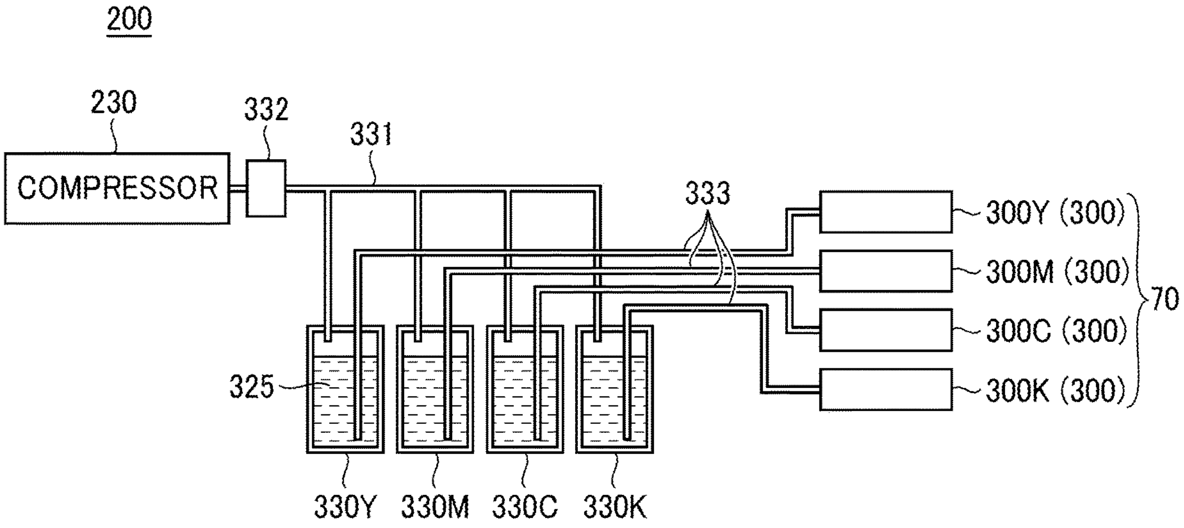
FIG. 4 is a diagram illustrating a configuration of a supply unit according to an embodiment of the present disclosure.

FIG. 4 is a diagram illustrating a configuration of a supply unit 200 in the liquid discharge apparatus 1000. The supply unit 200 supplies inks to the head unit 70 including the heads 300.

The head unit 70 includes a head 300Y that discharges an yellow (Y) ink, a head 300M that discharges a magenta (M) ink, a head 300C that discharges a cyan (C) ink, and a head 300K that discharges a black (K) ink.

The head unit 70 also includes a head 300Q that discharges an overcoating ink and a head 300P that discharges a primer ink or a white ink, and may further include a head that discharges an ink in addition to these inks. The heads 300 are a collective notation in a case where the heads 300Y, 300M, 300C, 300K, 300Q, and 300P, and the like are not particularly distinguished. The supply unit 200 supplies each color ink to the head 300 of each color.

The supply unit 200 includes ink tanks 330 as sealed containers that store inks 325 of respective colors discharged from the respective heads 300. The ink tanks 330 and injection openings (supply ports) of the heads 300 are coupled via tubes 333, respectively, so that the inks are supplied to the heads.

The ink tanks 330 are coupled to a compressor 230 via a pipe 331 including an air regulator 332, and the compressor 230 supplies pressure-applied air. As a result, in the liquid discharge apparatus 1000, the pressure-applied ink 325 of each color is supplied to the injection opening of each head 300 to discharge the ink 325 from the nozzles of each head 300.

Configuration Example of Head

Figure 5:
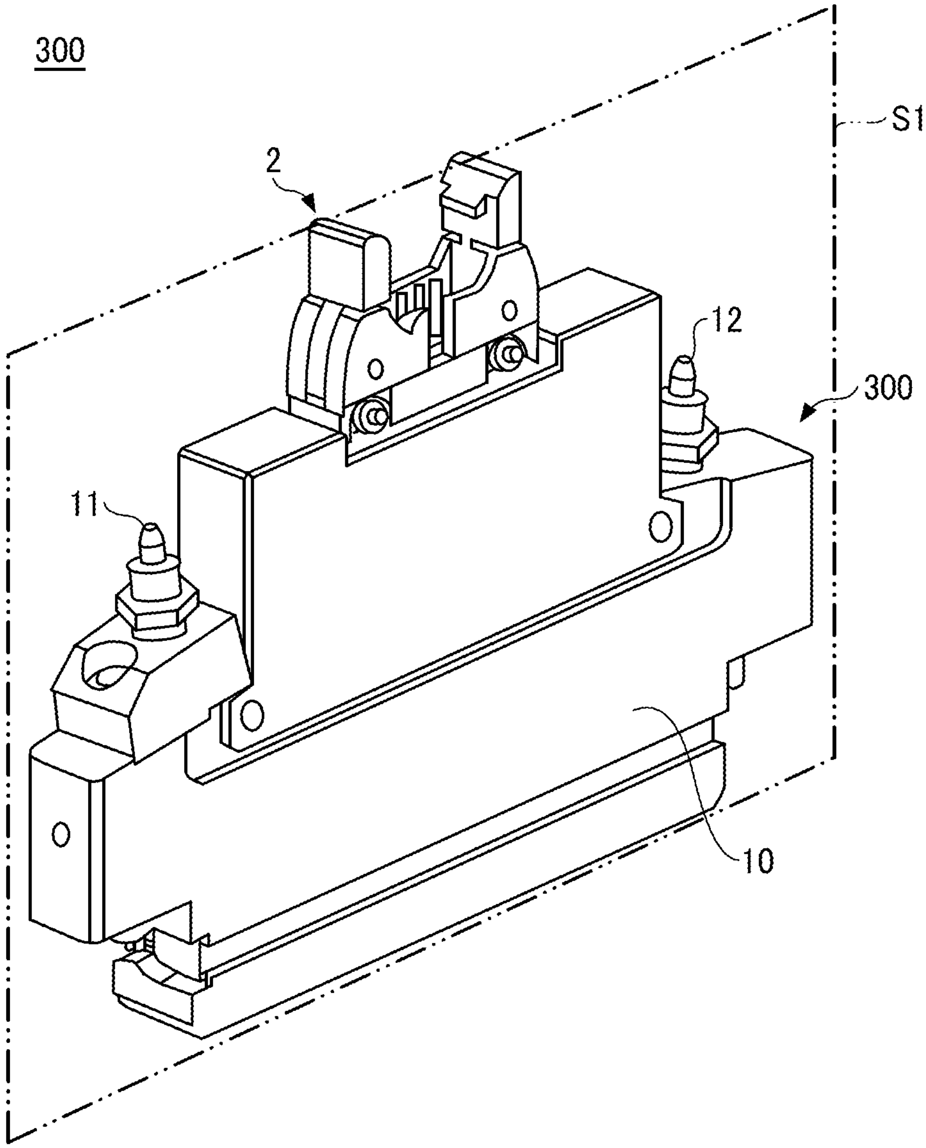
FIG. 5 is a perspective view illustrating a configuration of a head according to an embodiment of the present disclosure.
Figure 6:
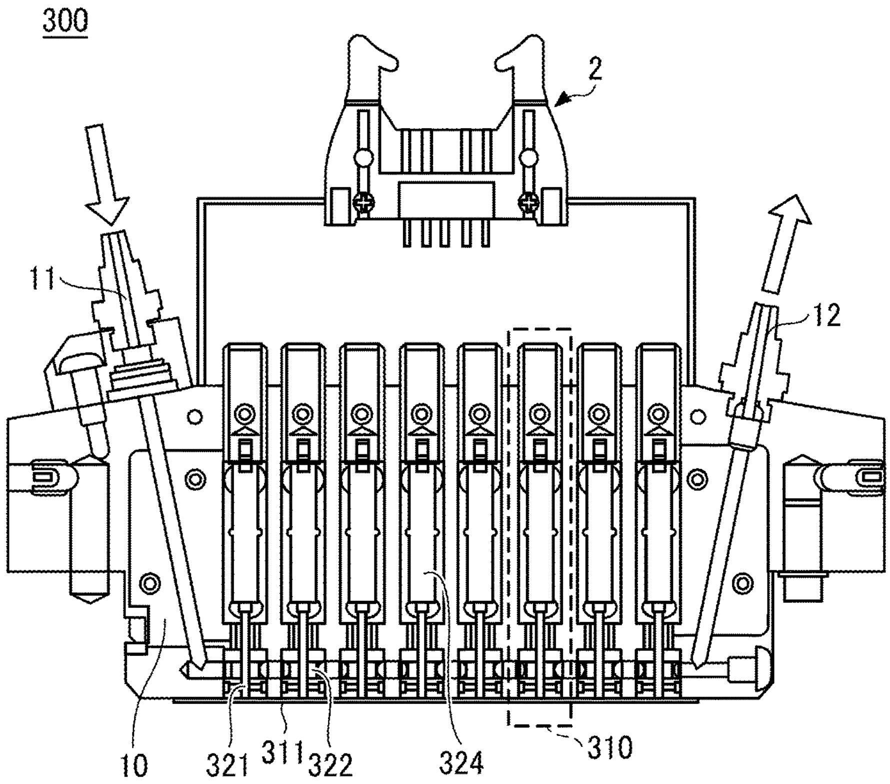
FIG. 6 is a cross-sectional view of the head in FIG. 5 taken along plane S1.

FIGS. 5 and 6 are views illustrating a configuration of the head 300. FIG. 5 is a perspective view. FIG. 6 is a cross-sectional view of the head 300 in FIG. 5 taken along a plane S1.

The head 300 includes a plurality of discharge modules 310 arranged in a row or a plurality of rows in a housing 10.

The head 300 includes a supply port 11 and a recovery port 12. The supply port 11 supplies a pressure-applied ink to the discharge modules 310 from the outside. The recovery port 12 discharges the ink that has not been discharged, to the outside. The housing 10 also includes a connector 2.

The discharge modules 310 include a nozzle sheet 311 including nozzles 321 that discharge an ink, a flow path 322 that communicates with the nozzles 321 and supplies pressure-applied liquid, and piezoelectric elements 324 that drive needle-shaped valve bodies that open and close the nozzles 321.

The nozzle sheet 311 is joined to the housing 10. The flow path 322 is a flow path shared by the plurality of discharge modules 310 provided in the housing 10, and supplies a pressure-applied ink from the supply port 11 and discharges the ink from the recovery port 12. Note that during a period in which the ink is discharged onto the recording object 100, the ink may not be temporarily discharged from the recovery port 12 in order not to lower the discharge efficiency of the ink from the nozzles 321.

Figure 7:
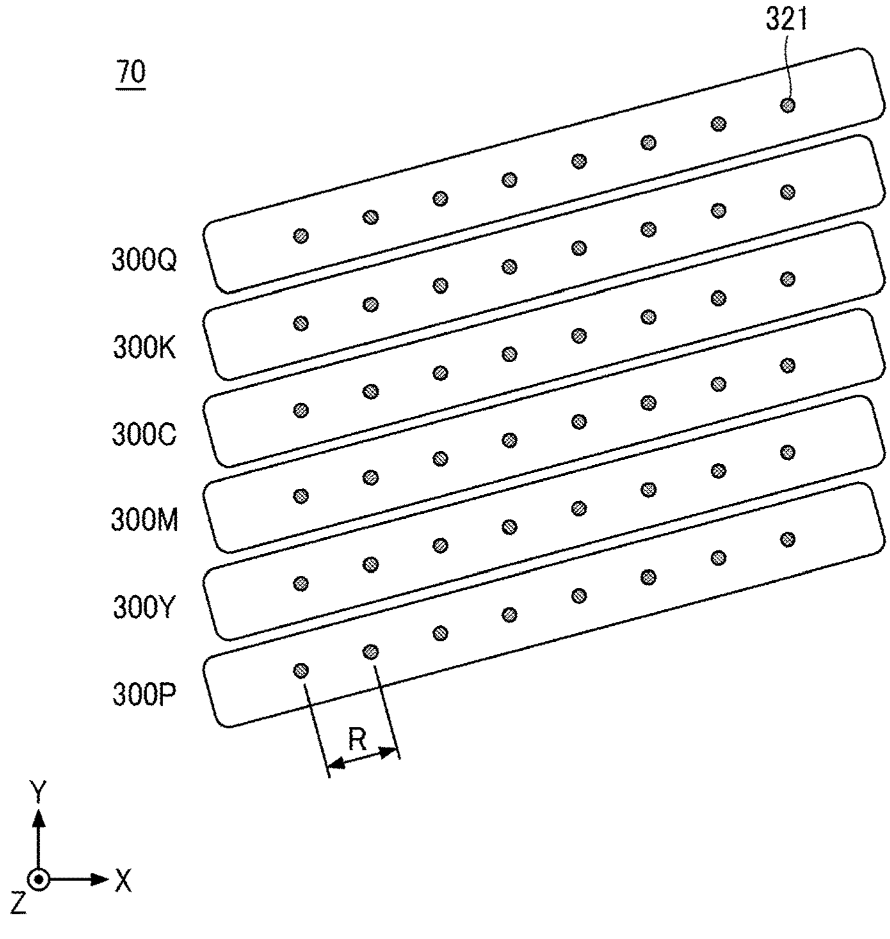
FIG. 7 is a plan view illustrating a configuration of a head unit according to an embodiment of the present disclosure.

FIG. 7 is a plan view of the head unit 70 as viewed from the recording object 100 side. Each head 300 included in the head unit 70 includes the plurality of nozzles 321 arrayed at intervals of a nozzle pitch R, and discharges an ink from each of the plurality of nozzles 321. The nozzle pitch refers to an interval between the nozzles 321 adjacent to each other. The adjacent nozzles 321 refer to two of the nozzles 321 closest to each other among the plurality of nozzles 321.

The head 300Q discharges an overcoating ink, the head 320K discharges a black ink, the head 300C discharges a cyan ink, the head 300M discharges a magenta ink, the head 300Y discharges an yellow ink, and the head 300P discharges a primer or white ink. The order in which the heads 300 align is an example, and the order is not particularly limited. Further, all the heads of the head unit 70 may discharge an ink of the same color.

In the present embodiment, the heads 300 can be tilted with respect to the recording object 100.

The liquid discharge apparatus 1000 varies, with the angle of the tilt of the heads 300 tilted by the tilt-varying mechanism 120, the intervals in the X direction and the Y direction of dots to be recorded on the recording object 100 with the ink discharged from the nozzles 321 and adhering to the recording object 100.

Figure 8:
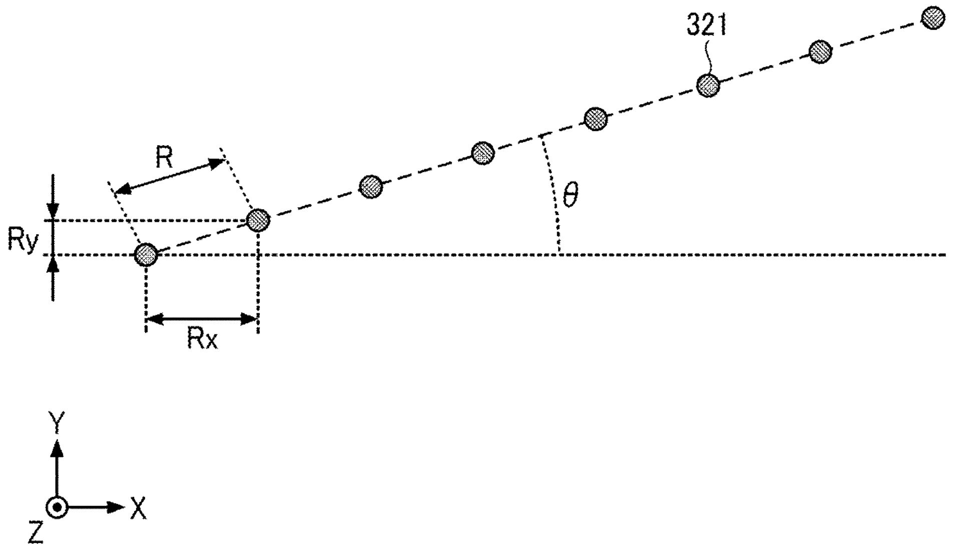
FIG. 8 is a diagram illustrating an example of a relationship between the tilt of the head and a nozzle pitch.

FIG. 8 is a diagram illustrating an example of a relationship between the tilt of the head 300 and the nozzle pitch. In FIG. 8, due to the tilt of the head 300 by an angle θ with the X direction (main-scanning direction) as the reference, the array direction of the nozzles 321 in the head 300 is tilted by an angle θ with respect to the X direction. The nozzle pitch R is a nozzle pitch along the array direction. Assuming that a nozzle pitch adjacent to each other along the X direction is Rx, and a nozzle pitch adjacent to each other along the Y direction (sub-scanning direction) is Ry, the nozzle pitches Rx and Ry are expressed as follows:

$$Rx = R\times\cos\theta \quad Ry = R\times\sin\theta$$

The nozzle pitch Ry adjacent to each other along the Y direction means an interval between the nozzles 321 located closest to each other along the Y direction. Even if one nozzle 321 of the two nozzles 321 is out of position with respect to the other nozzle 321 along the X direction, the two nozzles 321 are adjacent to each other along the Y direction as long as the nozzles 321 have the shortest distance along the Y direction. The interval along the Y direction between the two nozzles 321 corresponds to the nozzle pitch Ry.

Figure 9:
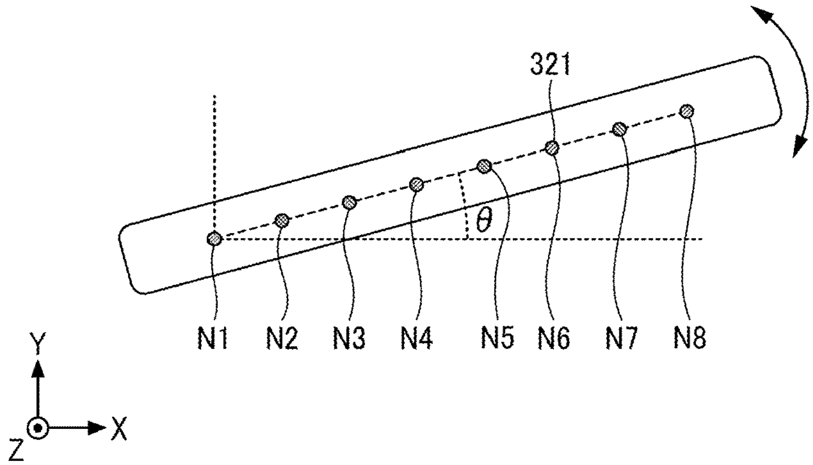
FIG. 9 is a diagram illustrating an example of the tilt of the head.

FIG. 9 is a diagram for explaining an example of the tilt of the head 300, and illustrates the head 300 tilted by the tilt-varying mechanism 120.

FIG. 9 illustrates eight nozzles 321 numbered from N2 to N8 toward the +X direction side, with the nozzle 321 on the most −X direction side in FIG. 9 as a reference nozzle N1. The tilt-varying mechanism 120 rotates the head 300 about the Z axis with the reference nozzle N1 as the rotation center to vary the tilt of the head 300.

For example, the tilt-varying mechanism 120 rotates the head 300 clockwise to shorten the nozzle pitch Ry along the Y direction, and rotates the head 300 counterclockwise to lengthen the nozzle pitch Ry along the Y direction.

When an angle θ is the minus side with respect to the X axis (an angle rotated clockwise around the reference nozzle N1), the positional relationship of the nozzles 321 is reversed, and the nozzle pitch Ry at the angle —0 is the same as the nozzle pitch Ry at the angle θ. The reference nozzle N1 is located closest to the +Y direction side. Table 1 shows the relationship between the angle θ of the head 300 and the nozzle pitch Ry in the Y directions.

TABLE 1

| Y-direction nozzle pitch | Angle |
|---|---|
| 3 × Ry0 | θ2 |
| 2 × Ry0 | θ1 |
| Ry0 | θ0 |
| Ry0 | −θ0 |
| 2 × Ry0 | −θ1 |
| 3 × Ry0 | −θ2 |

In order to perform recording without dot missing on the recording object 100 (a state where no dot is recorded at a position where a dot is to be recorded) and dot overlapping (a state where at least some of a plurality of dots overlap each other on the recording object 100), the line feed amount in the Y direction is proportional to the number N of the dots, where N is the number of the nozzles 321 in the head 300. The line feed amount in the Y direction is expressed as in the following Table 2 according to the number of times of interlacing. The number of times of interlacing is an odd number. The number of times of interlacing refers to the number of times of relative movements between the head and the recording object performed to record dots in a predetermined area on the recording object by the interlace recording process.

TABLE 2

| Y-direction nozzle pitch | Ry0 | Ry0 |
|---|---|---|
| Number of interlacing | 3 | 5 |
| Y-direction dot pitch | Ry0/3 | Ry0/5 |
| Number of nozzles | N | N |
| Line feed amount | (Ry0/3) × N | (Ry0/5) × N |

It has been described that the tilt of the head 300 is varied to vary the nozzle pitch Ry in the Y direction, but the nozzle pitch Rx in the X direction is varied in addition to the Y direction. Accordingly, in a case where the dots are recorded on the recording object 100, the liquid discharge apparatus 1000 preferably varies the ink discharge timing in the X direction to correct the positions where the ink is recorded. The liquid discharge apparatus 1000 appropriately performs this correction.

Example of Coupling between Head Unit and Head-Rotation Driving Device

Figure 10:
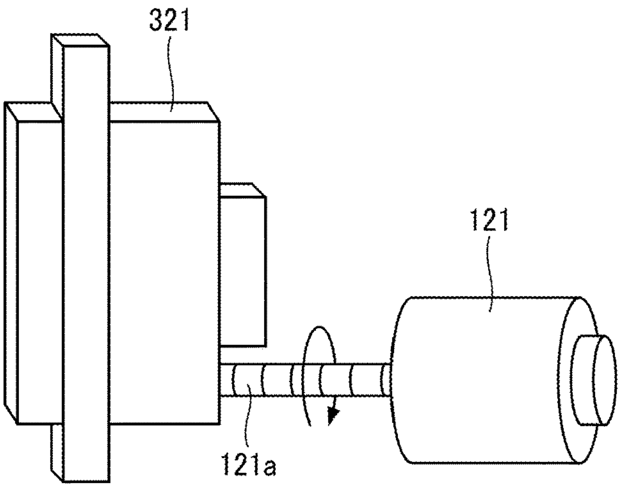
FIG. 10 is a diagram illustrating an example of coupling between the head unit and a head rotation motor.

FIG. 10 is a diagram illustrating an example of coupling between the head unit 70 and the head-rotation driving device 121.

As illustrated in FIG. 10, a shaft 121*a* extending from the head-rotation driving device 121 is coupled to the head 300. The head-rotation driving device 121 rotates the head 300 to vary the tilt of the head 300 with respect to the recording surface of the recording object 100. The liquid discharge apparatus 1000 may change the rotation ratio between the head-rotation driving device 121 and the head 300 by using a transmission mechanism, such as a gear.

For example, the reference nozzle N1 in FIG. 9 is used as the rotation center of the head 300 rotated by the head-rotation driving device 121, to suppress the movement of the head 300 in the Y direction.

Interlace Recording Process and Action Thereof

Next, the interlace recording process and the action will be described.

The interlace recording process refers to a process in which dots are recorded in a predetermined area on the recording object 100 by a plurality of relative movements between the heads 300 and the recording object 100 to record the dots on the recording object 100 at intervals narrower than the interval between the adjacent nozzles in the head.

In the interlace recording process, the liquid discharge apparatus 1000 discharges inks from the nozzles 321 of the heads 300 when the heads 300 are moving in, for example, the X direction. The liquid discharge apparatus 1000 performs two-dimensional dot recording on the recording object 100 by a combination of movement of the heads 300 along the X direction and movement of the heads 300 along the Y direction.

In a case where a pattern having a desired recording resolution is completed in a predetermined area on the recording object 100 by T times of scans, the liquid discharge apparatus 1000 intermittently feeds the heads 300 in the Y direction for the first time, the second time, the third time, . . . . In the (T+1)-th time of scan, the heads 300 and the recording object 100 have such a positional relationship that the heads 300 and the recording object 100 are seamlessly connected to a position corresponding to the length of the nozzle row of the nozzles 321 arrayed in the heads 300. In order to seamlessly connect the operations of performing the T times of recording to each other without any joint, the liquid discharge apparatus 1000 moves the heads 300 from the position of the heads 300 in the Y direction at the first scan by a "nozzle row length+one nozzle pitch" in the Y direction to perform the (T+1)-th scan.

As an example, assume a case where the number of nozzles per inch in the head 300 is 100, and the liquid discharge apparatus 1000 performs dot recording with a recording resolution of 600 dots per inch (dpi) in the X direction×400 dpi in the Y direction, that includes total eight times of head movements, two times in the X direction and four times in the Y direction.

In the case of the recording resolution of 600 dpi in the X direction×400 dpi in the Y direction, the interval between dots adjacent to each other along the X direction on the recording object 100 is 25.4 (mm)/600≈42.3 (μm), and the interval between dots adjacent to each other along the Y direction is 25.4 (mm)/400=63.5 (μm). In movement control of the heads 300 and discharge timing control of the inks from the heads 300, the movement amount and the position are controlled on the basis of the recording resolution. For example, in a case where M=8, eight dots are recorded by eight scans in a predetermined area on the recording object 100.

Hereinafter, with reference to FIGS. 11 to 15, the interlace recording process of each of a comparative example, a first example of the embodiment, and a second example of the embodiment, and the action thereof will be described.

Comparative Example

Figure 11:
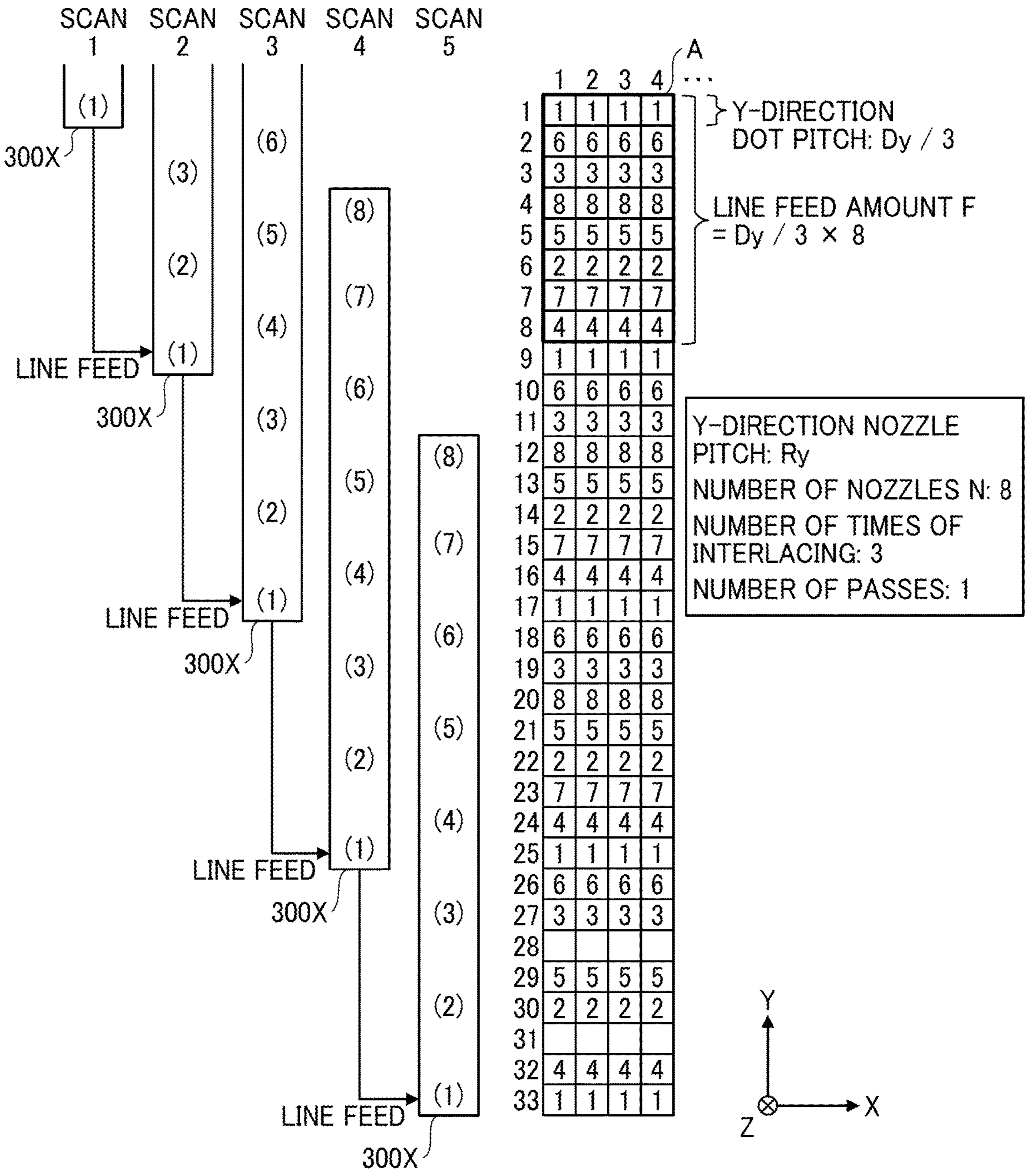
FIG. 11 is a diagram illustrating an interlace recording process according to a comparative example.

FIG. 11 is a diagram for explaining the interlace recording process according to a comparative example. In FIG. 11, the position of a head 300X indicates the position in the Y direction during the relative movement in the X direction.

A dot pitch Dy means the minimum pitch in the Y direction of dots to be recorded on a recording object 100, and corresponds to a recording resolution. For example, in a case where the number of times of interlacing is three, the following relationship is established.

$$Dy=Ry/3$$

"Scan" means a scan, and line feed is performed by a line feed amount F for each scan. In FIG. 11, each square in a dot pattern area A represents a dot to be recorded on the recording object, and numbers 1 to 8 displayed in each square correspond to the nozzle numbers of eight nozzles in the head 300X that discharge dots to be recorded at the position of each square.

In the example in FIG. 11, in accordance with the number N of the nozzles included in the head 300X being eight, the dot pattern area A is repeatedly recorded along the Y direction in a cycle corresponding to eight dots along the Y direction. The eight dots arrayed in the Y direction are recorded with an ink discharged from each of the eight nozzles. This cycle does not depend on the number of times of interlacing.

First Example of Embodiment

Figure 12:
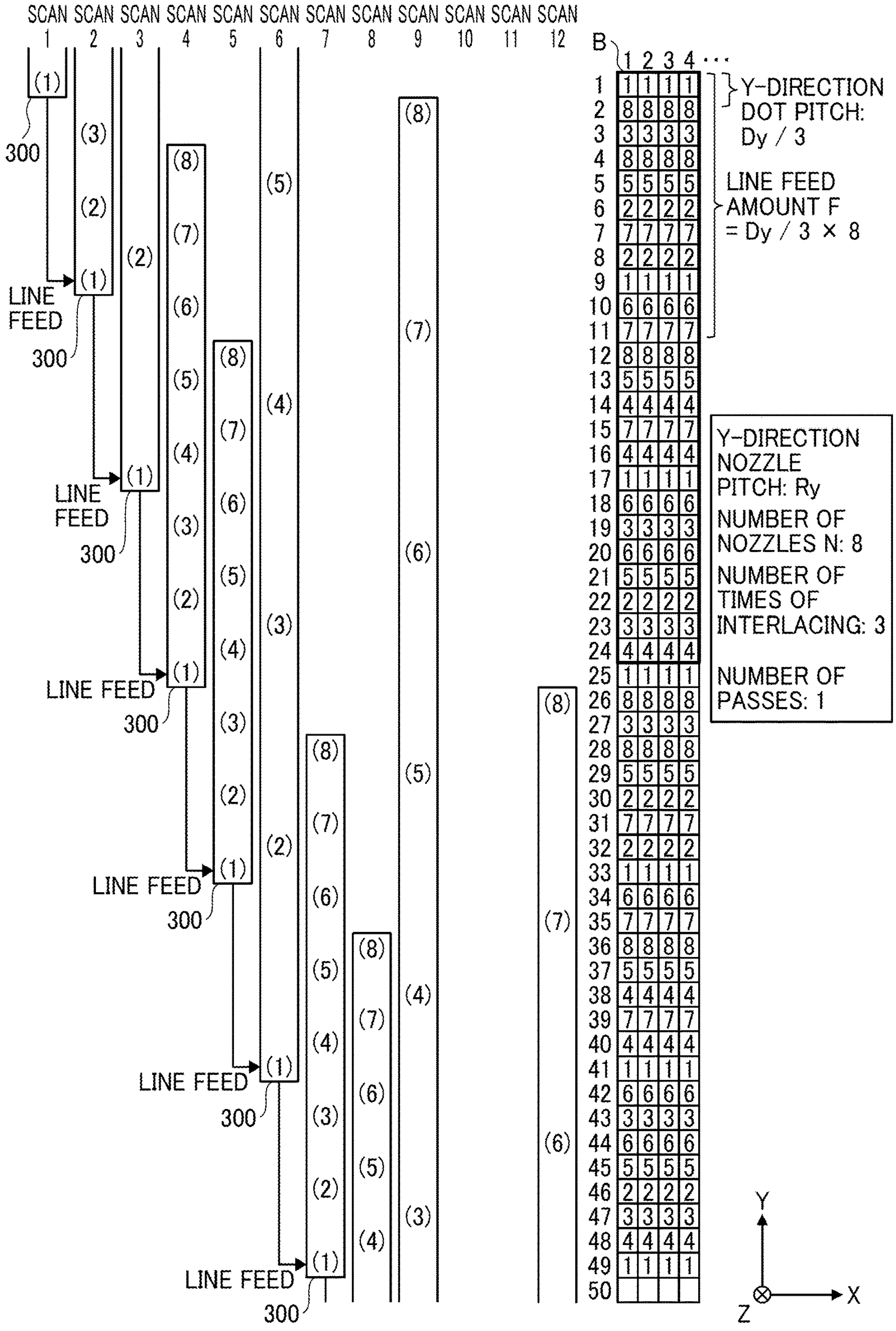
FIG. 12 is a first diagram of a first example of an interlace recording process according to an embodiment of the present disclosure.
Figure 13:
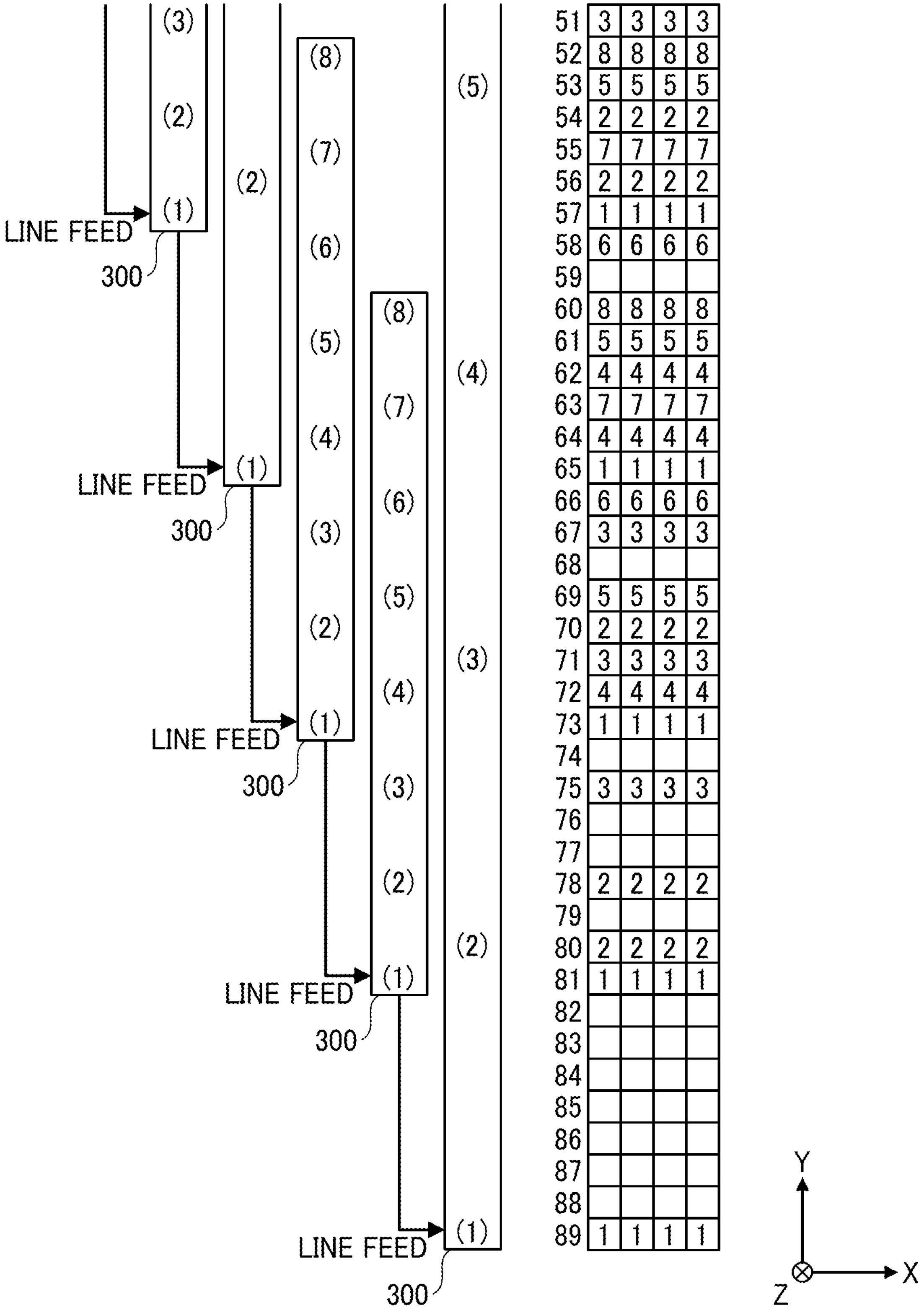
FIG. 13 is a second diagram of the first example of the interlace recording process.

Next, FIGS. 12 and 13 are diagrams illustrating a first example of the interlace recording process according to the present embodiment. FIG. 12 is a first diagram, and FIG. 13 is a second diagram. FIGS. 12 and 13 illustrate the positions of the head 300 in a case where 12 scans are performed. FIG. 12 illustrates the positions of the head 300 in the first half. FIG. 13 illustrates the positions of the head 300 in the second half. Note that the same terms as the terms used in the description of the comparative example mean the same contents, and redundant description is appropriately omitted here. The same applies to the second example described next to the first example.

In the first example, a line feed amount F is substantially the same for each of the plurality of scans. Note that "substantially the same" is not the strict sameness, but means that a difference to an extent generally recognized as an error is allowed. The difference to an extent generally recognized as an error is, for example, a distance of F/10, and also in this case, the effect of the embodiment is obtained similarly.

The controller 500 of the liquid discharge apparatus 1000 makes the head 300 and a recording object 100 perform a relative movement in the X direction, with the head 300 tilted to at least a first angle or a second angle by the tilt-varying mechanism 120. A first angle θ1 and a second angle θ2 are determined in advance. The first angle θ1 and the second angle θ2 are appropriately determined according to the number of times of interlacing, the number N of the nozzles 321 in the head 300, the intervals between the nozzles 321, or the like.

In the present embodiment, in the head 300, the interval between the nozzles 321 adjacent to each other along the Y direction is a first interval with the head 300 tilted to the first angle, and is a second interval, which is different from the first interval, with the head 300 tilted to the second angle.

For example, when the tilt of the head 300 is defined as a first angle θ0 and the second angle θ2, as shown in Table 1 described above, the nozzle pitch Ry0 at the first angle θ0 corresponds to the first interval, and the nozzle pitch 3×Ry0 at the second angle θ2 corresponds to the second interval. In the present embodiment, in particular, the nozzle pitch 3×Ry0, which is the second interval, is an integer multiple, which is two or more times, of the nozzle pitch Ry0, which is the first interval. In the first example according to the present embodiment, in particular, the nozzle pitch 3×Ry0 is an odd multiple, which is two or more times, of the nozzle pitch Ry0.

Although as illustrated in FIGS. 12 and 13, the number N of the nozzles 321 included in the head 300 is eight, a dot pattern area B is repeatedly recorded along the Y direction with a cycle of every 24 dots along the Y direction. The 24 dots arrayed in the Y direction are recorded by each of the eight nozzles. The cycle of the dot pattern area B of 24 dots in the Y direction is determined by the product of the number N, which is eight, of the nozzles 321 multiplied by the number, which is three, of times of interlacing.

The liquid discharge apparatus 1000 records a dot pattern area having higher randomness on a recording object 100 along the Y direction as the cycle of the dot pattern area B is lengthened (the number of dots is increased). The dot pattern area having higher randomness means that there are various ink discharge nozzles forming each dot of the dot pattern area.

The plurality of nozzles provided in the head may include a deviation error in the ink discharge characteristic of each nozzle interval or each nozzle. The deviation error in the ink discharge characteristic is, for example, a deviation error, such as the ink discharge amount of a specific nozzle is smaller than the ink discharge amount of another nozzle, or the ink discharge direction of a specific nozzle is different from the ink discharge direction of another nozzle. According to the deviation error of the nozzle, the positions of dots recorded on a recording object deviate and are at incorrect positions, and an unintended dot pattern is recorded on the recording object. The dot position incorrectness along the Y direction causes banding that is a streak-like density unevenness extending in the X direction.

In a dot pattern area having lower randomness in the Y direction, banding is more noticeable than in a dot pattern area having higher randomness. For example, since in the interlace recording process according to the comparative example, a dot pattern area having the cycle of eight dots along the Y direction is recorded, the deviation error of the eight nozzles leads to the position incorrectness of the eight dots along the Y direction. When the pattern of dots at incorrect positions along the Y direction extends in the X direction, banding is more noticeable.

The liquid discharge apparatus 1000 according to the embodiment lengthens the cycle of the dot pattern area B along the Y direction to 24 dots to record the dot pattern area B with an ink discharged from the more various nozzles 321. As a result, the randomness of the dot pattern area B is increased, and dot position deviation that accompanies the deviation error in the nozzles is dispersed on a recording object 100, so that the banding is less noticeable.

A dot recording state on the recording object 100 illustrated in FIGS. 12 and 13 is an example, and the liquid discharge apparatus 1000 makes the dot recording state different according to the combination of the nozzle pitches Ry in each scan. Table 3 shows a combination example of the nozzle pitches Ry.

TABLE 3

| | Y-direction nozzle pitch in first scan | Y-direction nozzle pitch in second scan | Y-direction nozzle pitch in third scan |
|---|---|---|---|
| Method 1 | Ry0 | Ry0 | 3 × Ry0 |
| Method 2 | Ry0 | 3 × Ry0 | 3 × Ry0 |
| Method 3 | Ry0 | 3 × Ry0 | 5 × Ry0 |
| Method 4 | Ry0 | 3 × Ry0 | Ry0 |
| Method 5 | 3 × Ry0 | Ry0 | 5 × Ry0 |
| Method 6 | 3 × Ry0 | 5 × Ry0 | 3 × Ry0 |

In Table 3, for example, in Method 1, the nozzle pitch Ry in the first scan is Ry0, the nozzle pitch Ry in the second scan is Ry0, and the nozzle pitch Ry in the third scan is 3×Ry0. In Method 3, the nozzle pitch Ry in the first scan is Ry0, the nozzle pitch Ry in the second scan is 3×Ry0, and the nozzle pitch Ry in the third scan is 5×Ry0. In this manner, the liquid discharge apparatus 1000 makes the nozzle pitch Ry different in each scan and changes the combination of the nozzle pitches Ry to make the recording state of the dots on a recording object 100 different. The same action can be obtained in any of the methods shown in Table 3.

When the interlace recording process in the first example is generalized, the dot pitch Dy is Ry0/K, and the line feed amount is Y/K×N, where N is the number of the nozzles 321 in the head 300, Ry0 is the nozzle pitch in the Y direction at the reference tilt angle θ0, and K (K is an odd number) is the number of times of interlacing.

The liquid discharge apparatus 1000 makes the nozzle pitches Ry along the Y direction the same value for every cycle of the dot pattern area (for example, a cycle corresponding to 24 dots). Further, in each of the first scan, the second scan, the third scan, . . . , and the K-th scan, the liquid discharge apparatus 1000 does not use the same nozzle pitch Ry along the Y direction but use a different nozzle pitch Ry in at least some of the scans. Further, the liquid discharge apparatus 1000 sets the nozzle pitch Ry in each scan, to an odd multiple of the reference nozzle pitch Ry0. As a result, the liquid discharge apparatus 1000 records a dot pattern area on a recording object 100 at a cycle of N×K. The dot pattern area differs depending on the nozzle pitch Ry at the time of each scan.

Second Example of Embodiment

Figure 14:
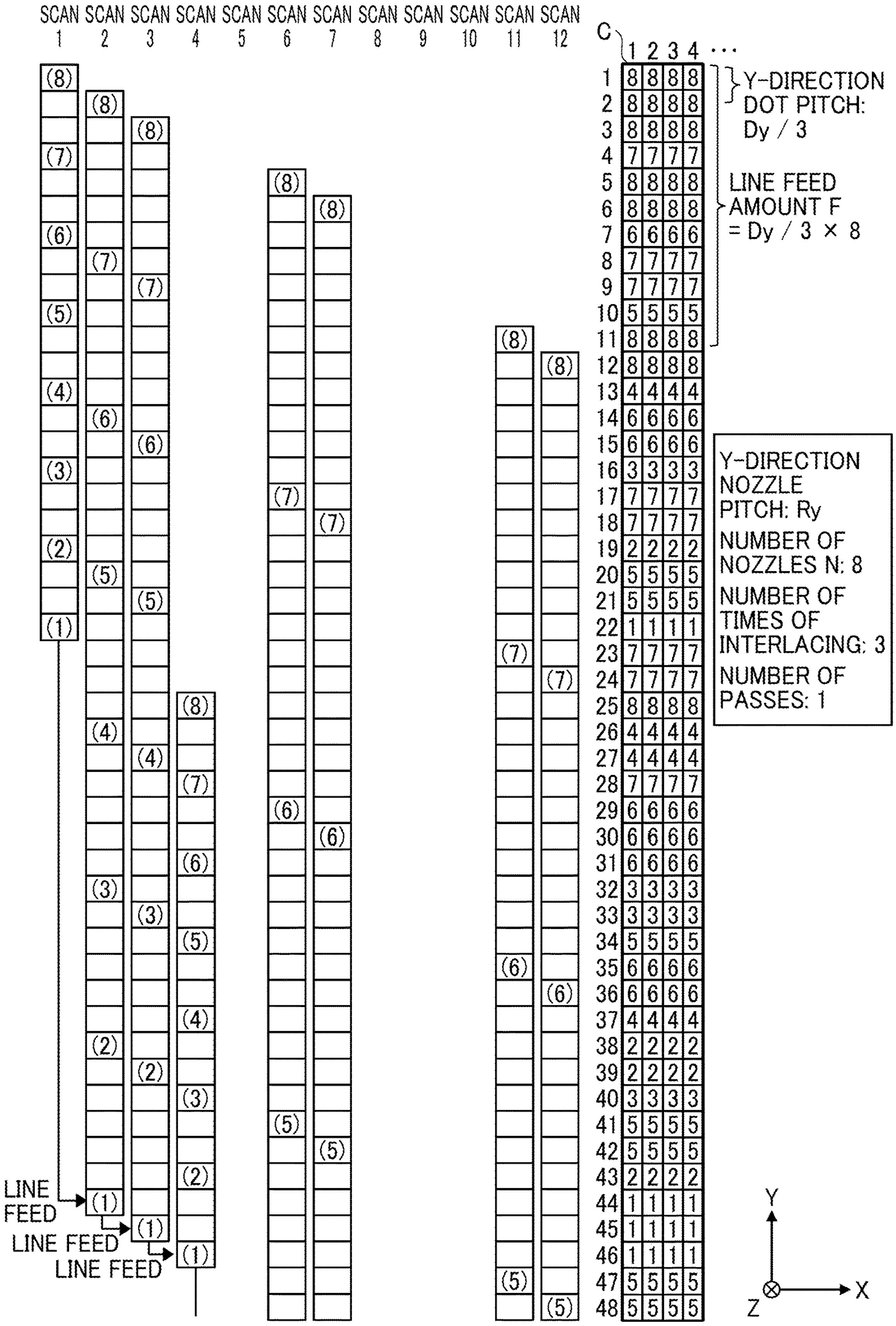
FIG. 14 is a first diagram of a second example of the interlace recording process.
Figure 15:
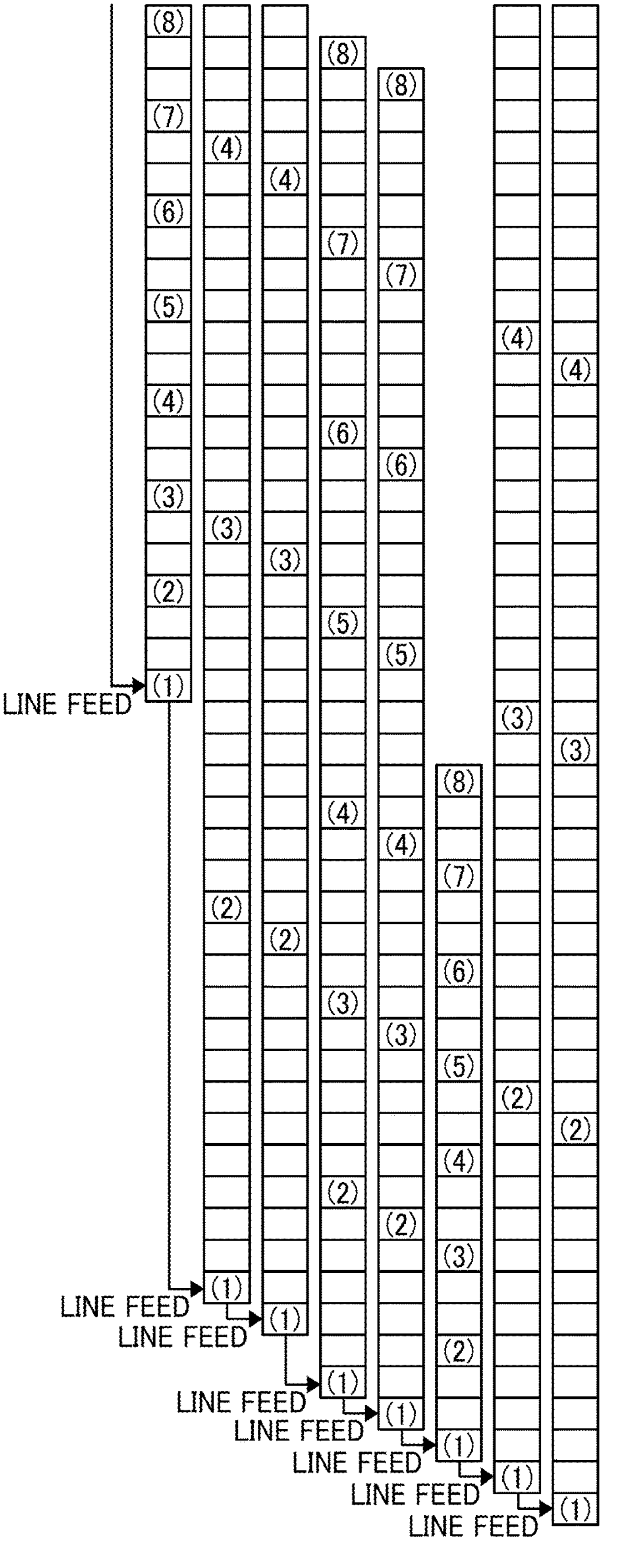
FIG. 15 is a second diagram of the second example of the interlace recording process.
Figure 15:
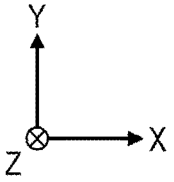

Next, FIGS. 14 and 15 are diagrams illustrating a second example of the interlace recording process according to the present embodiment. FIG. 14 is a first diagram, and FIG. 15 is a second diagram. FIGS. 14 and 15 illustrate the positions of the head 300 in a case where 12 scans are performed. FIG. 14 illustrates the positions of the head 300 in the first half. FIG. 15 illustrates the positions of the head 300 in the second half.

Similarly to the first example, the controller 500 of the liquid discharge apparatus 1000 makes the head 300 and a recording object 100 perform a relative movement in the X direction, with the head 300 tilted to at least a first angle or a second angle by the tilt-varying mechanism 120. In the head 300, the interval between the nozzles 321 adjacent to each other along the Y direction is a first interval with the head 300 tilted to the first angle, and is a second interval, which is different from the first interval, with the head 300 tilted to the second angle.

In the second example, the line feed amount F is not the same in each line feed performed in response to a plurality of scans, but the line feed amount F differs in at least some of the scans. In the second example, the second interval is an even multiple of the first interval.

Although as illustrated in FIGS. 14 and 15, the number N of the nozzles 321 included in the head 300 is eight, a dot pattern area C is repeatedly recorded along the Y direction with a cycle of every 96 dots along the Y direction. The 96 dots arrayed in the Y direction are recorded by each of the eight nozzles.

The liquid discharge apparatus 1000 may vary a scan start position of the head 300 at the time of each scan by a unit of the nozzle pitch Rx along the X direction. Varying the nozzle pitches Rx allows a dot pattern area with higher randomness to be recorded on a recording object 100.

In the example in FIGS. 14 and 15, the relationship between the scan order and the nozzle pitches Ry in the Y direction is represented as in Table 4 below. In the scan order in Table 4, for example, “1” means the first scan, and “4” means the fourth scan.

TABLE 4

| Nozzle pitch Ry | Scan order |
|---|---|
| Ry0 | 1, 4, 5, 10 |
| 2 × Ry0 | 2, 3, 8, 9 |
| 4 × Ry0 | 6, 7, 11, 12 |

96, which is the number of dots along the Y direction in the dot pattern area C, is determined by the product of the number N of the nozzles 321, the number K of times of interlacing, and the maximum value of even multiples of the first interval. For example, assuming that the number N is eight, the number K of times of interlacing is three, and the maximum value of even multiples of the first interval is 4, 96, which is the number of dots, is obtained by a product of 8×3×4.

To further increase the upper limit of the number of dots in the dot pattern area C, the types of the nozzle pitches Ry along the Y direction are increased.

The liquid discharge apparatus 1000 reverses the tilt direction of the head 300 with the tilt-varying mechanism 120 to reverse the arrangement order of the nozzles 321 along the Y direction.

When this is combined with the second example, the randomness of the dot pattern area C is further increased. Since in the second example, the line feed amount is not constant, the tilt-varying mechanism 120 may not be a rotation mechanism about the reference nozzle N1 (see FIG. 9).

Figure 16:
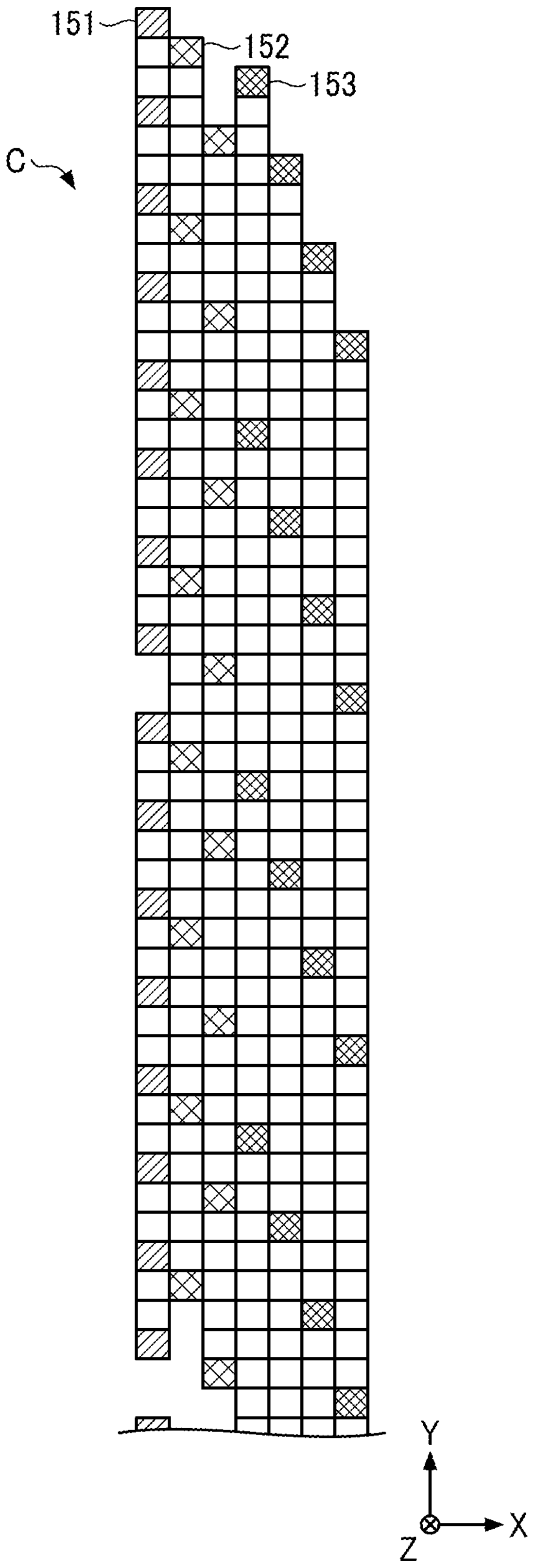
FIG. 16 is a first diagram of a dot pattern in the second example.
Figure 17:
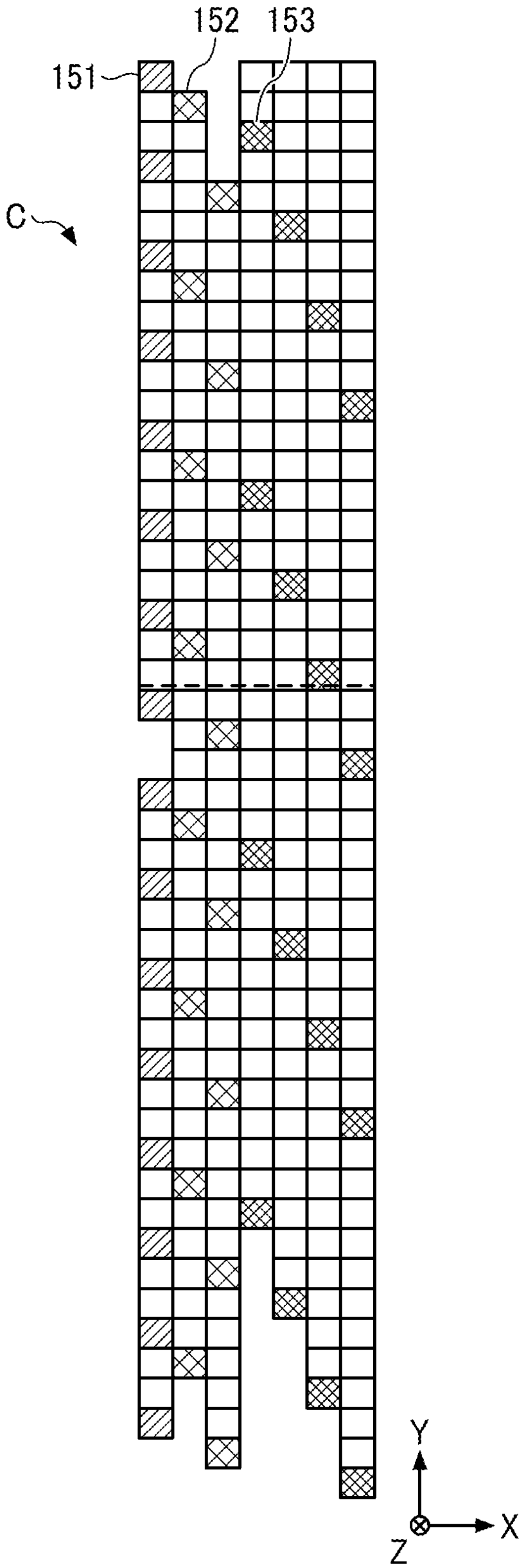
FIG. 17 is a second diagram of the dot pattern in the second example.

FIGS. 16 and 17 are diagrams illustrating an example of a dot pattern in the second example. FIG. 16 is a first diagram. FIG. 17 is a second diagram. FIG. 16 illustrates the first half of the dot pattern along the Y direction, and FIG. 17 illustrates the second half of the dot pattern along the Y direction.

The number K of times of interlacing in the dot pattern illustrated in FIGS. 16 and 17 is 3. Dots 151 indicated by oblique hatching are dots according to the nozzle pitch Ry0, and are recorded at equal intervals along the Y direction. Dots 152 indicated by thin dot hatching are dots according to a nozzle pitch 2×Ry0, and are recorded at equal intervals along the Y direction while reciprocation by one dot is performed in the X direction. Dots 153 indicated by dark dot hatching are dots according to a nozzle pitch 4×Ry0, and are recorded at equal intervals along the Y direction while reciprocation by four dots is performed in the X direction.

However, the liquid discharge apparatus 1000 does not necessarily need to continue the dot pattern illustrated in FIGS. 16 and 17, as a group. For example, the liquid discharge apparatus 1000 varies a scan start position of the head 300 at the time of each scan in such a manner that the scan start position is across each pattern in FIGS. 16 and 17, to form a nozzle pattern having higher randomness.

Assuming that the number of the nozzles 321 of the head 300 is N, and the nozzle pitch along the Y direction at the tilt angle θ0 is Ry0, both the first example and the second example are generalized as follows:

(1) The dot pitch is Ry0/K when the number K of times of interlacing is an odd number.

The nozzle pitches Ry include K kinds of combinations of positive odd multiples of the nozzle pitch Ry0.

Note that K may be the same value, but the present embodiment does not include a case where all of the nozzle pitches Ry are one time the nozzle pitch Ry0.

The nozzle pitches Ry include one time the nozzle pitch Ry0 or K kinds of combinations of positive even multiples of the nozzle pitch Ry0. Note that K may be the same value, but the present embodiment does not include a case where all of the nozzle pitches Ry are one time the nozzle pitch Ry0.

(2) The dot pitch is Ry0/K when the number K of times of interlacing is an even number.

The nozzle pitches Ry include one time the nozzle pitch Ry0 or K kinds of combinations of positive even multiples of the nozzle pitch Ry0. Note that K may be the same value, but the present embodiment does not include a case where all of the nozzle pitches Ry are one time the nozzle pitch Ry0.

According to the above (1) or (2), the number of dots in a dot pattern area along the Y direction is determined by the product of the number N of the nozzles 321, the number K of times of interlacing, and the maximum value of even multiples of the first interval. This dot pattern area varies depending on the nozzle pitch Ry at the time of each scan.

Operation Example of Liquid Discharge Apparatus

Figure 18:
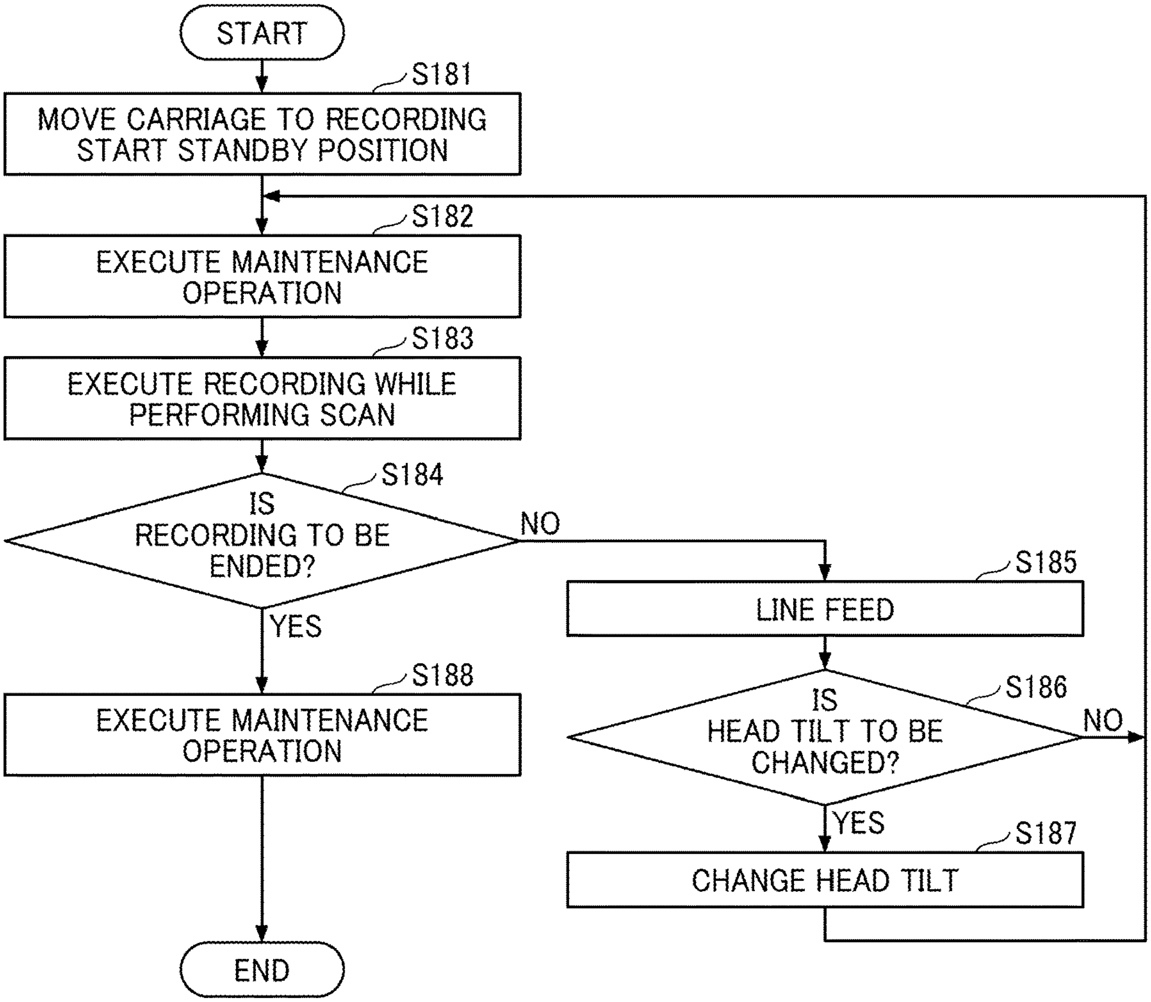
FIG. 18 is a flowchart illustrating an example of a recording operation of a liquid discharge apparatus according to an embodiment of the present disclosure.
Figure 19:
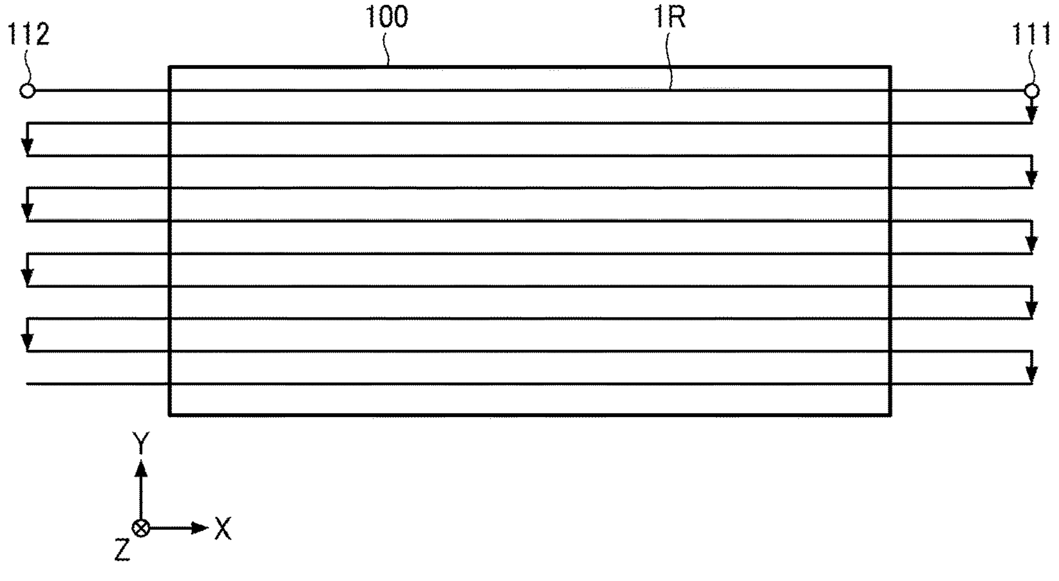
FIG. 19 is a front view of an example of a moving path of a carriage according to an embodiment of the present disclosure.
Figure 20:
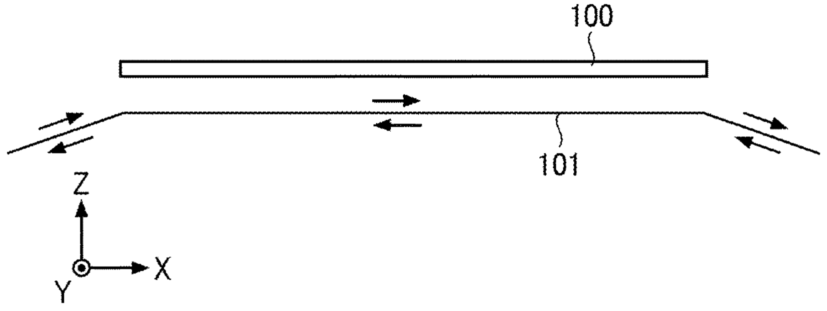
FIG. 20 is a side view of an example of a moving path of the carriage of FIG. 19.
Figure 21:
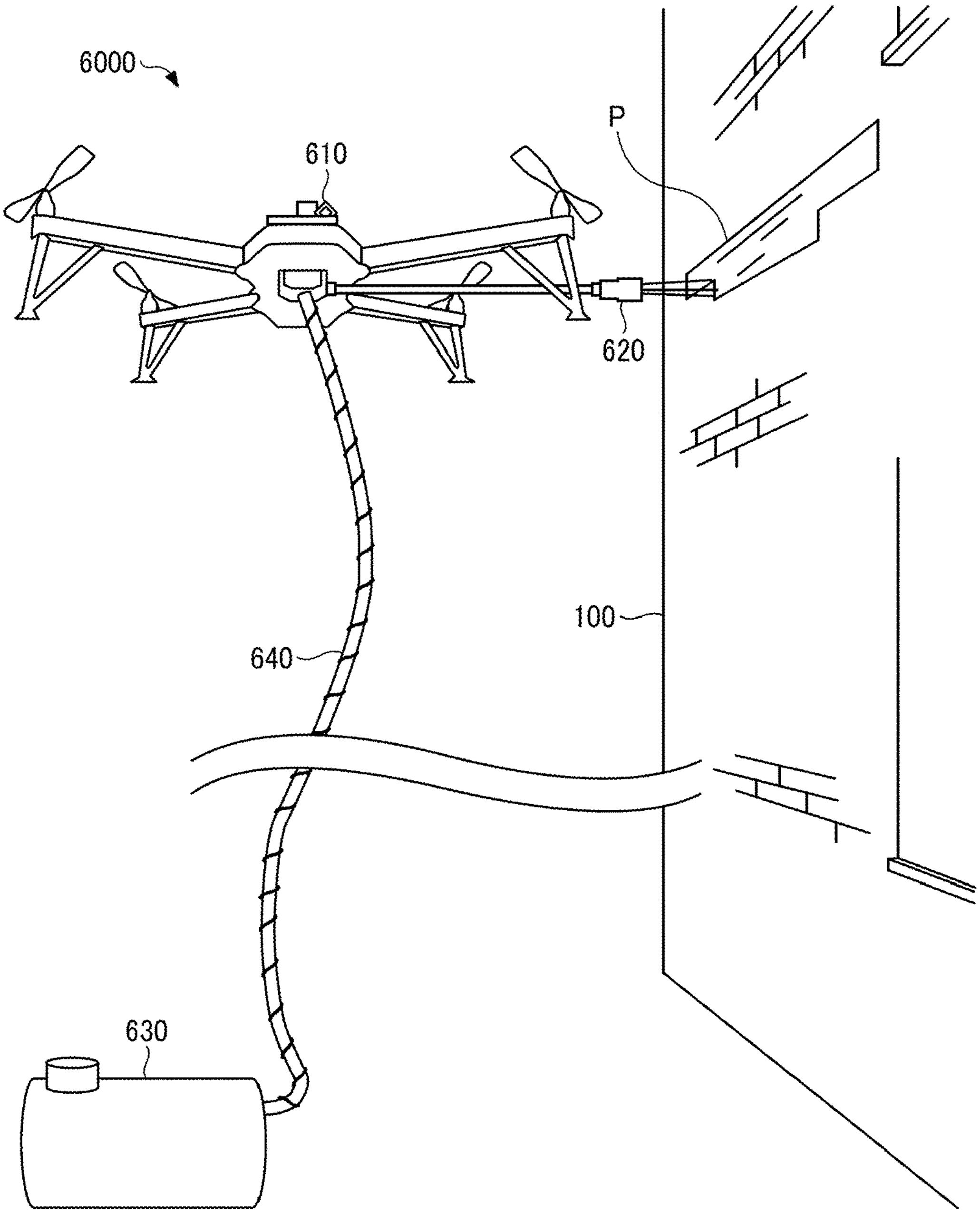
FIG. 21 is a diagram illustrating an application example in which a liquid discharge apparatus according to an embodiment of the present disclosure is applied to an unmanned aerial vehicle.

Operations of the liquid discharge apparatus 1000 will be described with reference to FIGS. 18 to 20. FIG. 18 is a flowchart illustrating an example of a recording operation of the liquid discharge apparatus 1000. FIG. 19 is a front view illustrating an example of a moving path of the carriage 1. FIG. 20 is a side view illustrating an example of a moving path of the carriage 1. In FIGS. 19 and 20, the moving path of the carriage 1 is indicated by 1R.

When the controller 500 receives a recording start instruction, the liquid discharge apparatus 1000 starts operations in FIG. 18.

First, in step S181, in the liquid discharge apparatus 1000, the controller 500 controls the X-direction driving device 72, the Y-direction driving device 82, and the Z-direction driving device 92 to move the carriage 1 to a recording start standby position 112 in FIG. 19. The recording start standby position 112 is a position away from the recording area of a recording object 100 in the −X direction by a predetermined distance, and more away from the recording surface of the recording object 100 in the Z direction than the position at the time of recording is.

Subsequently, in step S182, the liquid discharge apparatus 1000 performs a maintenance operation of the heads 300 at the recording start standby position 112. The maintenance operation is an operation for maintaining and recovering the ink discharge function by the heads 300, and is an operation for discharging the thickening inks in the heads 300, an operation for wiping the nozzle sheets 311 of the heads 300, and the like.

Subsequently, in step S183, in the liquid discharge apparatus 1000, the controller 500 controls the X-direction driving device 72 and the Z-direction driving device 92 to make the carriage 1 move toward the +X direction side while approaching the recording surface, as illustrated in FIG. 20, so that a recording operation based on recording data as original data of the recording is performed. That is, in the liquid discharge apparatus 1000, the controller 500 performs ink discharge from the nozzles 321 while moving the carriage 1 toward the +X direction side.

When the carriage 1 becomes out of the recording area, in the liquid discharge apparatus 1000, the controller 500 controls the X-direction driving device 72 and the Z-direction driving device 92 to move the carriage 1 to the +X direction side while moving the carriage 1 in a direction away from the recording surface (−Z direction side), and stop the carriage 1 at a reversing position 111.

Subsequently, in step S184, in the liquid discharge apparatus 1000, the controller 500 determines whether or not to end the recording.

In a case where in step S184, the recording data remains, and thus it is determined that the recording is not to be ended (No in step S184), in step S185, in the liquid discharge apparatus 1000, the controller 500 controls the Y-direction driving device 82 to move the carriage 1 toward the −Y direction side.

Subsequently, in step S186, in the liquid discharge apparatus 1000, the controller 500 determines whether or not to change the tilt of the heads 300.

In a case where in step S186, it is determined not to change the tilt (No in step S186), the liquid discharge apparatus 1000 shifts the operation to step S182, and performs the operations in and after step S182 again.

On the other hand, in a case where in step S186, it is determined to change the tilt (Yes in step S186), in step S187, in the liquid discharge apparatus 1000, the controller 500 controls the tilt-varying mechanism 120 to change the tilt of the heads 300. Then, the liquid discharge apparatus 1000 shifts the operation to step S182, and performs the operations in and after step S182 again.

The moving direction of the carriage 1 in step S183 includes moving toward the −X direction side and moving toward the +X direction side depending on the position where step S185 is executed.

In a case where in step S184, it is determined that the recording is to be ended (Yes in step S184), in step S188, the liquid discharge apparatus 1000 performs a maintenance operation of the heads 300 at the recording start standby position 112, and then ends the operation.

With this maintenance operation, the liquid discharge apparatus 1000 ends the operation, with the residual ink removed from the nozzle plates 311.

As described above, the liquid discharge apparatus 1000 records ink dots on the recording object 100.

Effects of Liquid Discharge Apparatus

As described above, the liquid discharge apparatus 1000 records dots of ink (liquid) on a recording object 100 (medium) by the interlace recording process. The liquid discharge apparatus 1000 includes the heads 300 that discharge inks from each of the plurality of nozzles 321, the moving mechanism 110 that makes the heads 300 and the recording object 100 perform a relative movement in each of the X direction (main-scanning direction) and the Y direction (sub-scanning direction) that intersects the X direction, the tilt-varying mechanism 120 that varies the tilt of the heads 300 with respect to the recording object 100, and the controller 500 that controls the recording of the dots on the recording object 100 by the liquid discharge apparatus 1000.

The controller 500 makes the heads 300 and the recording object 100 perform the relative movement in the X direction with the heads 300 tilted to at least the first angle (for example, angle θ0) or the second angle (for example, angle 2×θ0) by the tilt-varying mechanism 120. The interval between the nozzles 321 adjacent to each other along the Y direction is a first interval (for example, the nozzle pitch Ry0) with the heads 300 tilted to the first angle, and is a second interval (for example, the nozzle pitch 2×Ry0), which is different from the first interval, with the heads 300 tilted to the second angle.

For example, in the interlace recording process according to the comparative example, a scan is repeated while the positional relationship between the nozzles in the head 300X is kept constant in the Y direction, and thus banding becomes noticeable. As a result, the dot recording quality on the recording object may deteriorate.

In the present embodiment, the tilt of the heads 300 is varied in at least some of a plurality of scans, so that the positional relationship between the nozzles 321 for each scan is not constant. As a result, the liquid discharge apparatus 1000 increases the randomness of the dot pattern area and makes the banding less noticeable. As described above, in the present embodiment, the liquid discharge apparatus that records dots of liquid on a medium by the interlace recording process suppresses the deterioration in the dot recording quality.

In the present embodiment, the second interval is an integral multiple, which is two or more times, of the first interval. As a result, effects similar to the effects described above are obtained.

Further, as described in the first example, in the present embodiment, the moving mechanism 110 performs a plurality of operations that each include the relative movement between the heads 300 and the recording object 100 in the X direction and the relative movement between the heads 300 and the recording object 100 in the Y direction. A line feed amount F in each of a plurality of line feeds (relative movements in the Y direction) is the same, and the second interval is an odd multiple, which is two or more times, of the first interval. As a result, effects similar to the effects described above are obtained.

As described in the second example, in the liquid discharge apparatus 1000, the relative movement amount in each of the plurality of line feeds may differ in at least some of the line feeds, and the second interval may be an even multiple of the first interval. Also in this case, effects similar to the effects described above are obtained.

Note that an odd multiple of the first interval may be a substantially odd multiple of the first interval, and an even multiple of the first interval may be a substantially even multiple of the first interval. The substantially odd multiple and the substantially even multiple are not a strict odd multiple and a strict even multiple, and mean that a difference to an extent generally recognized as an error is allowed. The difference to an extent generally recognized as an error is a distance that is 1/10 or less the first interval, and also in this case, similar effects as the above-described effects are obtained.

Although eight has been exemplified as the number N of the nozzles, the number is not limited to eight, and the number of the nozzles is appropriately changed.

OTHER EMBODIMENTS

Hereinafter, application examples of the embodiment will be described with reference to FIGS. 21 to 24. The embodiment can also be applied to an unmanned aerial vehicle 6000, such as a drone, illustrated in FIG. 21. The unmanned aerial vehicle 6000 controls the position of the unmanned aerial vehicle 6000 on the basis of detection results of a detector 610, such as a distance measuring sensor, mounted on the unmanned aerial vehicle. The unmanned aerial vehicle 6000 includes a head 620 that discharges ink, and supplies ink stored in a liquid tank 630 to the head 620 via a cable 640. On the basis of the position control described above, the unmanned aerial vehicle 6000 discharges the ink from the head 620 toward a recording object 100 (a wall surface of a building in the present embodiment) to apply the ink to a portion P to be painted of the recording object 100. In this case, the head 300 according to the embodiment is used as the head 620.

Figure 22:
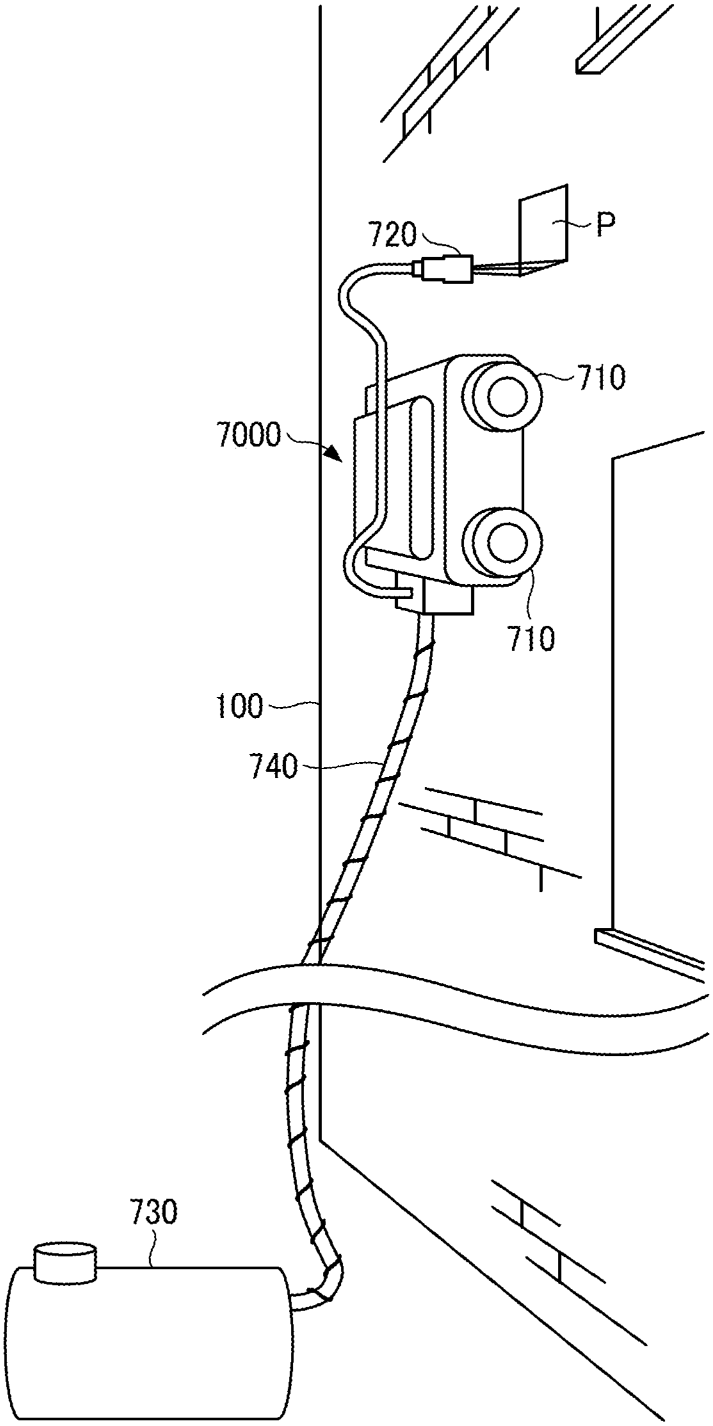
FIG. 22 is a diagram illustrating a first application example in which a liquid discharge apparatus according to an embodiment of the present disclosure is applied to an unmanned vehicle.

The embodiment can also be applied to an unmanned vehicle 7000, such as a wall climbing robot, illustrated in FIG. 22. The unmanned vehicle 7000 moves by driving rollers 710 while sucking a recording object 100 (a wall surface of a building in the present embodiment) at the bottom of the unmanned vehicle 7000. The unmanned vehicle 7000 includes a head 720 that discharges ink, and supplies the ink stored in a liquid tank 730 to the head 720 via a cable 740. The unmanned vehicle 7000 discharges the ink from the head 720 toward the recording object 100 (the wall surface of the building in the present embodiment) to apply the ink to a portion P to be painted of the recording object 100. In this case, the head 300 is used as the head 720.

Figure 23:
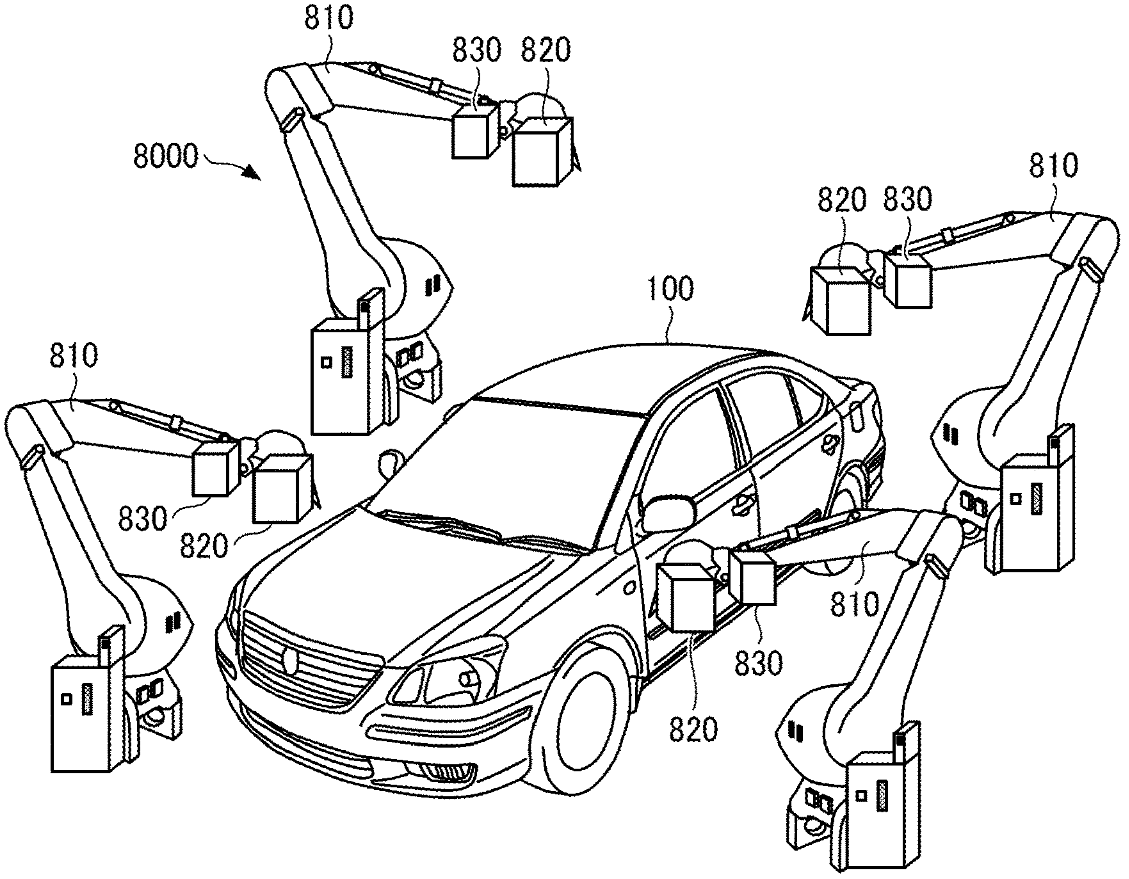
FIG. 23 is a diagram of an application example in which a liquid discharge apparatus according to an embodiment of the present disclosure is applied to a painting robot.

The embodiment can also be applied to a painting robot 8000 for, for example, painting a car body illustrated in FIG. 23. The painting robot 8000 includes a robot arm 810 that includes a plurality of joints that allows free movement like a human arm, and includes a head 820 that discharges ink at a distal end of the robot arm 810. The robot arm 810 also includes a three-dimensional (3D) sensor 830 in the vicinity of the head 820. As the painting robot 8000, an articulated robot having an appropriate number of axes, such as five axes, six axes, and seven axes, may be used. The painting robot 8000 detects the position of the head 820 with respect to a recording object 100 (a car body in the present embodiment) with the 3D sensor 830, and moves the robot arm 810 on the basis of the detection result to paint the recording object 100. In this case, the head 300 according to the embodiment is used as the head 820.

Figure 24:
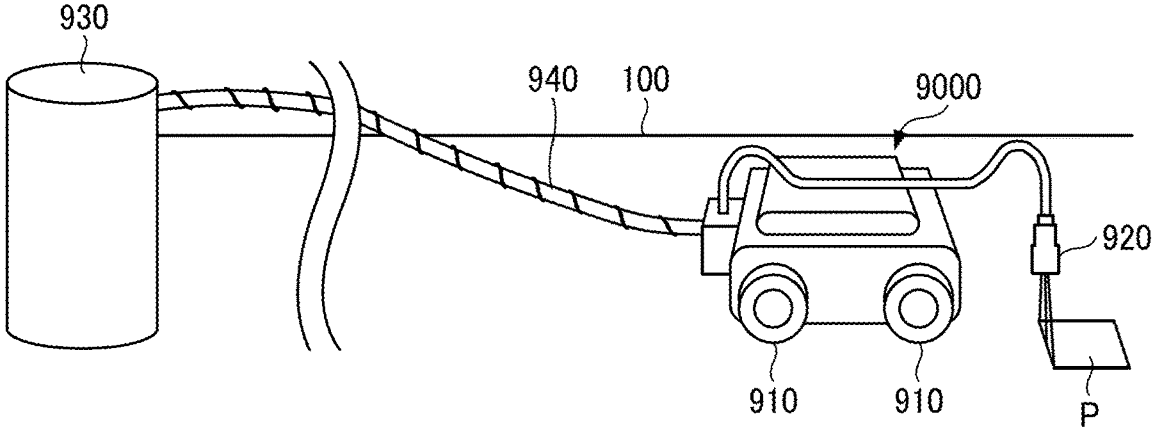
FIG. 24 is a diagram of a second application example in which a liquid discharge apparatus according to an embodiment of the present disclosure is applied to an unmanned vehicle.

The embodiment can also be applied to an unmanned vehicle 9000, such as a road surface traveling robot, illustrated in FIG. 24. The unmanned vehicle 9000 moves on a recording object 100 (in the present embodiment, a road surface, such as a roadway or a sidewalk) by driving wheels 910. The unmanned vehicle 9000 includes a head 920 that discharges ink, and supplies the ink stored in a liquid tank 930 to the head 920 via a cable 940. The unmanned vehicle 9000 discharges the ink from the head 920 toward the recording object 100 to apply the ink to a portion P to be painted of the recording object 100 to form, for example, a crosswalk, a stop line, a center line, and the like on the road surface. In this case, the head 300 according to the embodiment is used as the head 920.

Instead of the configuration of the embodiment, the sub-scanning movement may be performed by driving a printing medium, with the heads stopped. That is, a supporting member that supports a recording object 100 may be provided, and a motor as a driving source for moving the supporting member with respect to the heads may be provided.

In an embodiment, the liquid discharged from the head may be a solution, a suspension, an emulsion, or the like containing a solvent, such as water or an organic solvent, a colorant, such as a dye or a pigment, a function-imparting material, such as a polymerizable compound, a resin, or a surfactant, a biocompatible material, such as deoxyribonucleic acid (DNA), amino acid, protein, or calcium, an edible material, such as a natural pigment, or the like. These are used for, for example, inkjet ink, paint, surface treatment liquid, liquid for forming constituent elements, such as electronic elements and light emitting elements, and electronic circuit resist patterns, material liquid for three-dimensional modeling, and the like. Liquid discharge apparatuses according to embodiments are not limited to the embodiment in FIG. 1. A liquid discharge apparatus according to an embodiment may be an inkjet printer for printing an image on a sheet of paper. A liquid discharge apparatus according to an embodiment may be a multifunction peripheral having functions, such as a scanner and a facsimile machine, in addition to printing.

The medium means a medium to which liquid sticks and adheres, a medium to which liquid sticks and permeates, and the like. Specific examples thereof include recording media, such as a car body, a building material, a sheet of paper, recording paper, a recording sheet of paper, a film, and cloth, an electronic board, electronic parts, such as a piezoelectric element, and media, such as a powder layer (powder layer), an organ model, and an inspection cell, and include all things to which liquid adheres unless otherwise specified.

The embodiment also includes a liquid discharge method. For example, the liquid discharge method is a liquid discharge method by a liquid discharge apparatus that records dots of liquid on a medium by an interlace recording process. The liquid discharge method includes: by a head of the liquid discharge apparatus, discharging the liquid from each of a plurality of nozzles; by a moving mechanism of the liquid discharge apparatus, making the head and the medium perform a relative movement in each of a main-scanning direction and a sub-scanning direction that intersects the main-scanning direction; by a tilt-varying mechanism of the liquid discharge apparatus, varying a tilt of the head with respect to the medium; and by a controller of the liquid discharge apparatus, controlling the recording by the liquid discharge apparatus, in which the controller makes the head and the medium perform the relative movement in the main-scanning direction with the head tilted to at least a first angle or a second angle by the tilt-varying mechanism, and an interval between the nozzles adjacent to each other along the sub-scanning direction is a first interval with the head tilted to the first angle, and is a second interval, which is different from the first interval, with the head tilted to the second angle. Such a liquid discharge method provides similar effects as the effects of the liquid discharge apparatus 1000 described above.

Each function of the embodiment is implemented by one or a plurality of processing circuits. Here, the term "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules, designed to execute the recited functions.

Although the present disclosure has been specifically described above on the basis of the embodiments, the present invention is not limited to the embodiments, and it goes without saying that various modifications can be made within the scope of the technical idea described in the claims.

The invention claimed is:

1. A liquid discharge apparatus configured to record dots of liquid on a medium by interlace recording, the liquid discharge apparatus comprising:

a head configured to discharge the liquid from a plurality of nozzles;

a mover configured to relatively move the head and the medium in each of a main-scanning direction and a sub-scanning direction intersecting the main-scanning direction;

a tilt adjuster configured to change a tilt of the head with respect to the medium; and control circuitry configured to control recording on the medium by the liquid discharge apparatus, the control circuitry being configured to cause the mover to relatively move the head and the medium in the main-scanning direction with the head tilted to at least a first angle or a second angle by the tilt adjuster, wherein an interval between adjacent nozzles of the plurality of nozzles in the sub-scanning direction is a first interval in a state where the tilt of the head is the first angle, and the interval between adjacent nozzles of the head in the sub-scanning direction is a second interval different from the first interval in a state where the tilt of the head is the second angle.

2. The liquid discharge apparatus according to claim 1, wherein the second interval is an integer multiple of two or more times of the first interval.

3. The liquid discharge apparatus according to claim 1, wherein the mover is configured to perform a plurality of operations that each include a relative movement between the head and the medium in the main-scanning direction and a relative movement between the head and the medium in the sub-scanning direction, and wherein a relative movement amount in each of a plurality of relative movements in the sub-scanning direction is same in any of the relative movements in the sub-scanning direction, and the second interval is an odd multiple of two or more times of the first interval.

4. The liquid discharge apparatus according to claim 1, wherein the mover is configured to perform a plurality of operations that each include a relative movement between the head and the medium in the main-scanning direction and a relative movement between the head and the medium in the sub-scanning direction, and wherein a relative movement amount in each of a plurality of relative movements in the sub-scanning direction differs in at least some of the relative movements in the sub-scanning direction, and the second interval is an even multiple of the first interval.

5. A liquid discharge method for recording dots of liquid on a medium by interlace recording, the method comprising:

discharging the liquid from a plurality of nozzles of a recording head;

relatively moving the recording head and the medium in each of a main-scanning direction and a sub-scanning direction intersecting the main-scanning direction, in the interlace recording;

changing a tilt of the recording head with respect to the medium in the interlace recording; and controlling the interlace recording to relatively move the recording head and the medium in the main-scanning direction with the recording head tilted to at least a first angle or a second angle, wherein an interval between nozzles adjacent to each other in the sub-scanning direction is a first interval with the recording head tilted to the first angle, and is a second interval, which is different from the first interval, with the recording head tilted to the second angle.

* * * * *